(12) United States Patent
Wang et al.

(10) Patent No.: US 12,142,074 B2
(45) Date of Patent: Nov. 12, 2024

(54) LIGHT RECOGNITION MODULE FOR DETERMINING A USER OF A COMPUTING DEVICE

(71) Applicant: Apple Inc., Cupertino, CA (US)

(72) Inventors: Paul X. Wang, Cupertino, CA (US); Keith J. Hendren, San Francisco, CA (US); Adam T. Garelli, Santa Clara, CA (US); Antonio Clarke, Cupertino, CA (US); Joshua L. Daigle, San Francisco, CA (US); Dinesh C. Mathew, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/449,333

(22) Filed: Aug. 14, 2023

(65) Prior Publication Data

US 2024/0037984 A1    Feb. 1, 2024

Related U.S. Application Data

(63) Continuation of application No. 16/583,072, filed on Sep. 25, 2019, now Pat. No. 11,727,718.

(60) Provisional application No. 62/737,021, filed on Sep. 26, 2018.

(51) Int. Cl.
| | |
|---|---|
| *G06V 40/16* | (2022.01) |
| *G06F 3/00* | (2006.01) |
| *G06V 10/145* | (2022.01) |
| *H04N 23/80* | (2023.01) |
| *G06V 20/64* | (2022.01) |

(52) U.S. Cl.
CPC .......... *G06V 40/166* (2022.01); *G06F 3/005* (2013.01); *G06V 10/145* (2022.01); *G06V 40/172* (2022.01); *H04N 23/80* (2023.01); *G06V 20/64* (2022.01)

(58) Field of Classification Search
CPC .. G06V 40/166; G06V 10/145; G06V 40/172; G06V 20/64; G06F 3/005; H04N 23/80
See application file for complete search history.

(56) References Cited

U.S. PATENT DOCUMENTS

| 8,970,664 B2 | 3/2015 | Kanade et al. | |
|---|---|---|---|
| 9,349,035 B1 | 5/2016 | Gerber et al. | |
| 11,019,239 B2 * | 5/2021 | Fletcher | G01B 11/2513 |
| 11,226,718 B2 | 1/2022 | Cheng | |
| 2005/0012723 A1 | 1/2005 | Pallakoff | |
| 2011/0255000 A1 * | 10/2011 | Weber | B23K 26/351 |
| | | | 219/121.72 |
| 2013/0251215 A1 | 9/2013 | Coons | |

(Continued)

*Primary Examiner* — Hung H Lam
(74) *Attorney, Agent, or Firm* — Dorsey & Whitney LLP

(57) ABSTRACT

This application relates to a laptop computer. The laptop computer includes a base portion pivotally coupled to a lid portion is described. The laptop computer includes a display assembly carried by the lid portion, where the display assembly includes a light-transmissive cover, a display layer overlaid by the light-transmissive cover, a display stack electrically coupled to and overlaid by the display layer, and a light pattern recognition module adjacent to the display stack and overlaid by the display layer. The light pattern recognition module includes (i) a light pattern projector that projects a light pattern directly through the display layer.

20 Claims, 21 Drawing Sheets

(56) References Cited

U.S. PATENT DOCUMENTS

| | | | |
|---|---|---|---|
| 2013/0258234 A1* | 10/2013 | Park | G02F 1/133528 |
| | | | 349/58 |
| 2014/0043265 A1 | 2/2014 | Chang et al. | |
| 2014/0063265 A1* | 3/2014 | Shukla | H04N 23/57 |
| | | | 348/374 |
| 2014/0063406 A1* | 3/2014 | Park | G02F 1/133308 |
| | | | 349/106 |
| 2014/0063407 A1* | 3/2014 | Kwon | G02F 1/1339 |
| | | | 349/106 |
| 2014/0225131 A1* | 8/2014 | Benson | G06F 1/1643 |
| | | | 257/82 |
| 2015/0035936 A1 | 2/2015 | Robinson et al. | |
| 2018/0218371 A1 | 8/2018 | Wang et al. | |
| 2019/0158713 A1 | 5/2019 | McMillan et al. | |
| 2021/0149460 A1 | 5/2021 | Hsieh et al. | |

* cited by examiner

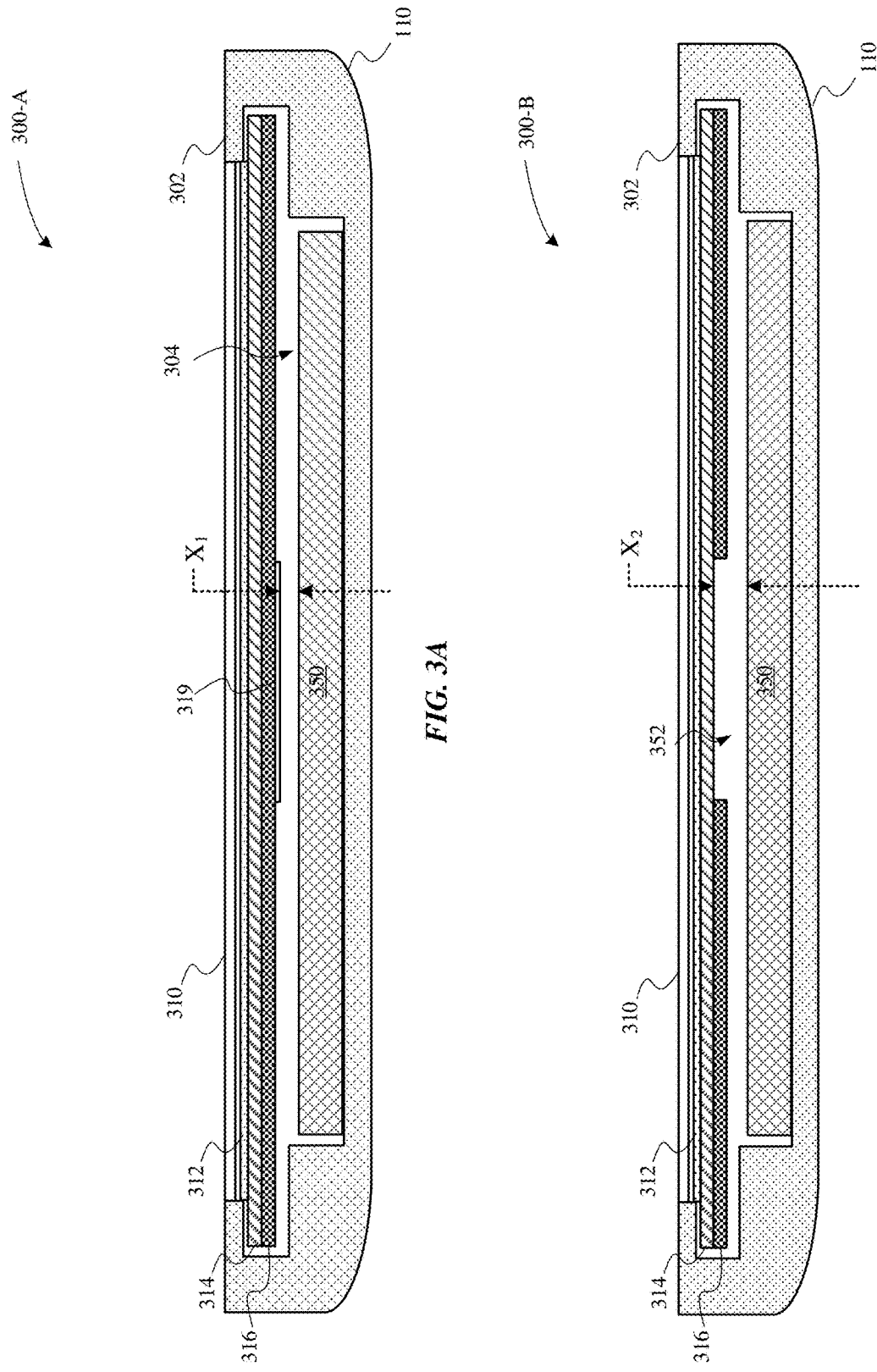

LIGHT RECOGNITION MODULE FOR DETERMINING A USER OF A COMPUTING DEVICE

CROSS-REFERENCE TO RELATED APPLICATIONS

The present application is a continuation of U.S. patent application Ser. No. 16/583,072, filed Sep. 25, 2019, entitled "LIGHT RECOGNITION MODULE FOR DETERMINING A USER OF A COMPUTING DEVICE," now U.S. Pat. No. 11,727,718, issued Aug. 15, 2023, which claims the benefit of U.S. Provisional Application No. 62/737,021, entitled "LIGHT RECOGNITION MODULE FOR DETERMINING A USER OF A COMPUTING DEVICE," filed Sep. 26, 2018, the content of which is incorporated herein by reference in its entirety for all purposes.

FIELD

The described embodiments relate generally to a biometric authentication module for authenticating a user of a portable computing device. More particularly, the described embodiments relate to a light pattern recognition module that is capable of emitting a predetermined pattern of light at the user, and subsequently detecting a pattern of light that is reflected by the user for authenticating the user.

BACKGROUND

Recent advances in computing devices have enabled users to perform a variety of complex functions such as internet browsing, chatting, word processing, graphic design, video editing, and so forth. However, by performing these complex functions, sensitive data associated with these users may be gathered and/or stored by these computing devices. To prevent unauthorized users from accessing this sensitive data, these computing devices may incorporate systems and mechanisms for authenticating users.

SUMMARY

This paper describes various embodiments that relate to a biometric authentication module for authenticating a user of a portable computing device. In particular, the various embodiments relate to a light pattern recognition module that is capable of emitting a predetermined pattern of light at the user, and subsequently detecting a pattern of light that is reflected by the user for authenticating the user.

According to some embodiments, a laptop computer having a base portion pivotally coupled to a lid portion is described. The laptop computer includes a display assembly carried by the lid portion, where the display assembly includes a light-transmissive cover, a display layer overlaid by the light-transmissive cover, a display stack electrically coupled to and overlaid by the display layer, and a light pattern recognition module adjacent to the display stack and overlaid by the display layer. The light pattern recognition module includes a light pattern projector that projects a light pattern directly through the display layer.

According to some embodiments, a portable computing device including a first housing portion pivotally coupled to a second housing portion, is described. The portable computing device includes a processor capable of providing instructions, a display layer in communication with the processor and capable of executing a function based on the instructions provided by the processor, and a light pattern recognition module overlaid by the display layer and in communication with the processor. The light pattern recognition module includes a light pattern emitter capable of emitting a pattern of light towards an object, and a light pattern detector capable of detecting a reflected pattern of light when the emitted pattern of light is reflected by the object so that: (i) when the light pattern detector determines that the reflected pattern of light corresponds to a target pattern of light, the processor provides a first set of instructions to the display layer for executing a first function; otherwise (ii) the processor provides a second set of instructions to the display layer for executing a second function different than the first function.

According to some embodiments, a portable computing device is described. The portable computing device includes a housing having a base portion pivotally coupled to a lid portion, where the lid portion carries operational components that include a controller, a display stack electrically coupled to the controller and having a notch formed therein, a light pattern detection module in communication with the controller and carried by a bracket assembly, where the bracket assembly is disposed within the notch in the display stack, and a display layer that overlays the display stack and the light pattern detection module.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 3A-3C illustrate cross-sectional views of a portable computing device, in accordance with some embodiments.

DETAILED DESCRIPTION

Figure 1A:
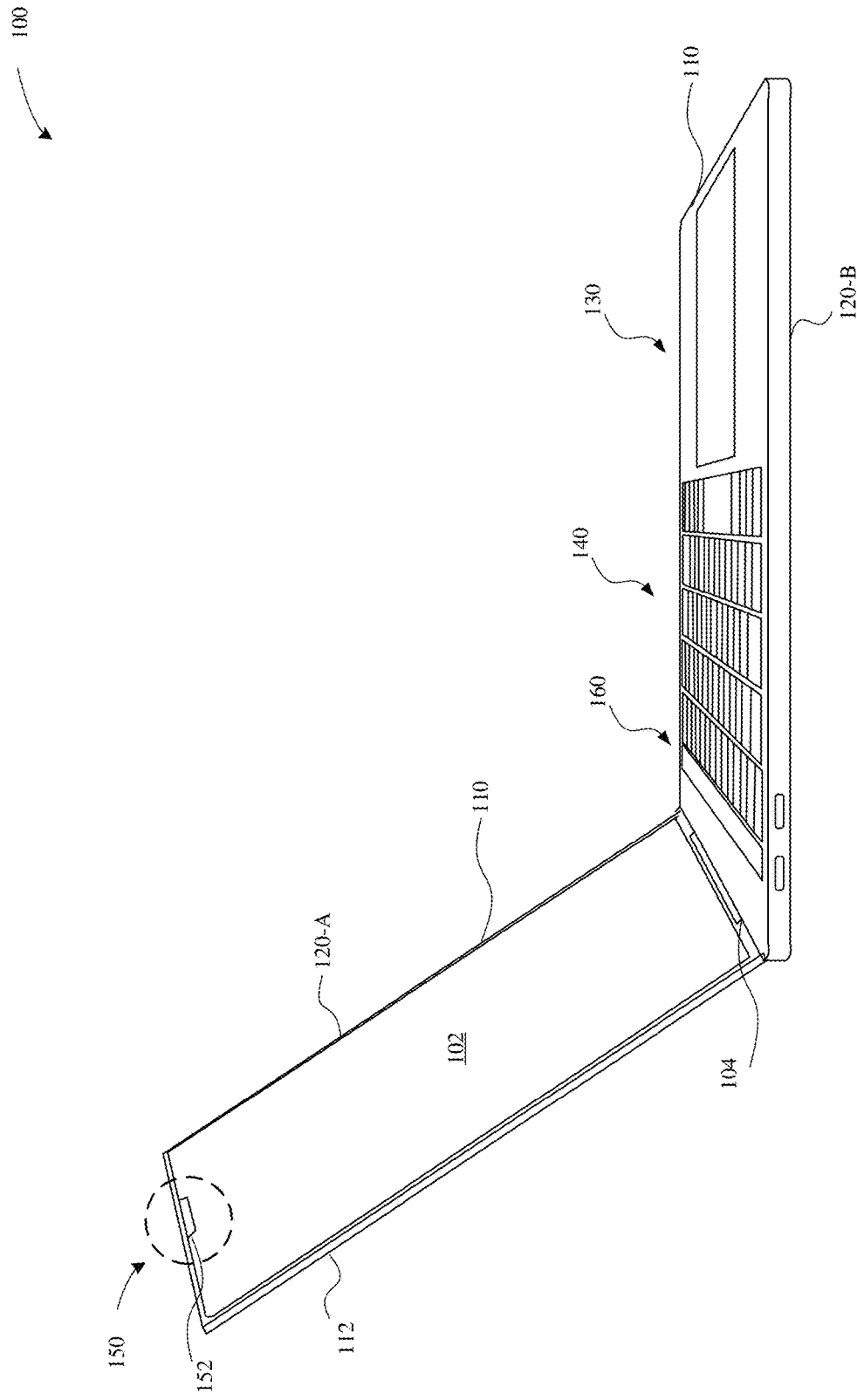
FIGS. 1A-1B illustrate various perspective views of a portable computing device that is capable of incorporating the various systems described herein, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein relate generally to a system for recognizing a user of a computing device. In particular, the various embodiments relate to a light pattern recognition module that is capable of emitting a predetermined pattern of light at the user, and subsequently detecting a pattern of light that is reflected by the user for authenticating the user.

Recent advances in computing devices have enabled users to perform a variety of complex functions such as internet browsing, chatting, word processing, graphic design, video editing, and so forth. However, by performing these complex functions, sensitive data associated with these users may be gathered and/or stored by these computing devices. To prevent unauthorized users from accessing this sensitive data, these computing devices may incorporate systems and mechanisms for authenticating users. In some examples, the systems may implement authentication schemes for authenticating users. However, due to the amount of limited space available with internal cavities of these computing devices, these authentication schemes should be compact (or have thin profiles) without sacrificing accuracy of user recognition.

To cure the aforementioned deficiencies, the systems and technique described herein relate to a light pattern recognition module that may be incorporated within a computing device (e.g., a laptop computer, a notebook, a desktop computer, etc.). In particular, the light pattern recognition module includes a light emitter that is capable of projecting a predetermined pattern of light (e.g., infrared light) and a light detector that is capable of detecting a pattern of light caused by reflection of the predetermined pattern of light from an object (e.g., a user). The light pattern recognition module includes a controller that is capable of comparing the predetermined pattern of light to a target pattern of light. Although the systems and techniques described herein are described with relation to recognizing users and/or authenticating users, the systems and techniques may also be applicable to capturing face gestures and emotions, video chatting, generating emoji, encrypting data, unlocking the computing device, supplementing passwords, differentiating different users, and the like.

According to some embodiments, a laptop computer having a base portion pivotally coupled to a lid portion is described. The laptop computer includes a display assembly carried by the lid portion, where the display assembly includes a light-transmissive cover, a display layer overlaid by the light-transmissive cover, a display stack electrically coupled to and overlaid by the display layer, and a light pattern recognition module adjacent to the display stack and overlaid by the display layer. The light pattern recognition module includes a light pattern projector that projects a light pattern directly through the display layer.

These and other embodiments are discussed below with reference to FIGS. 1-14; however, those skilled in the art will readily appreciate that the detailed description given herein with respect to these figures is for explanatory purposes only and should not be construed as limiting.

Figure 1B:
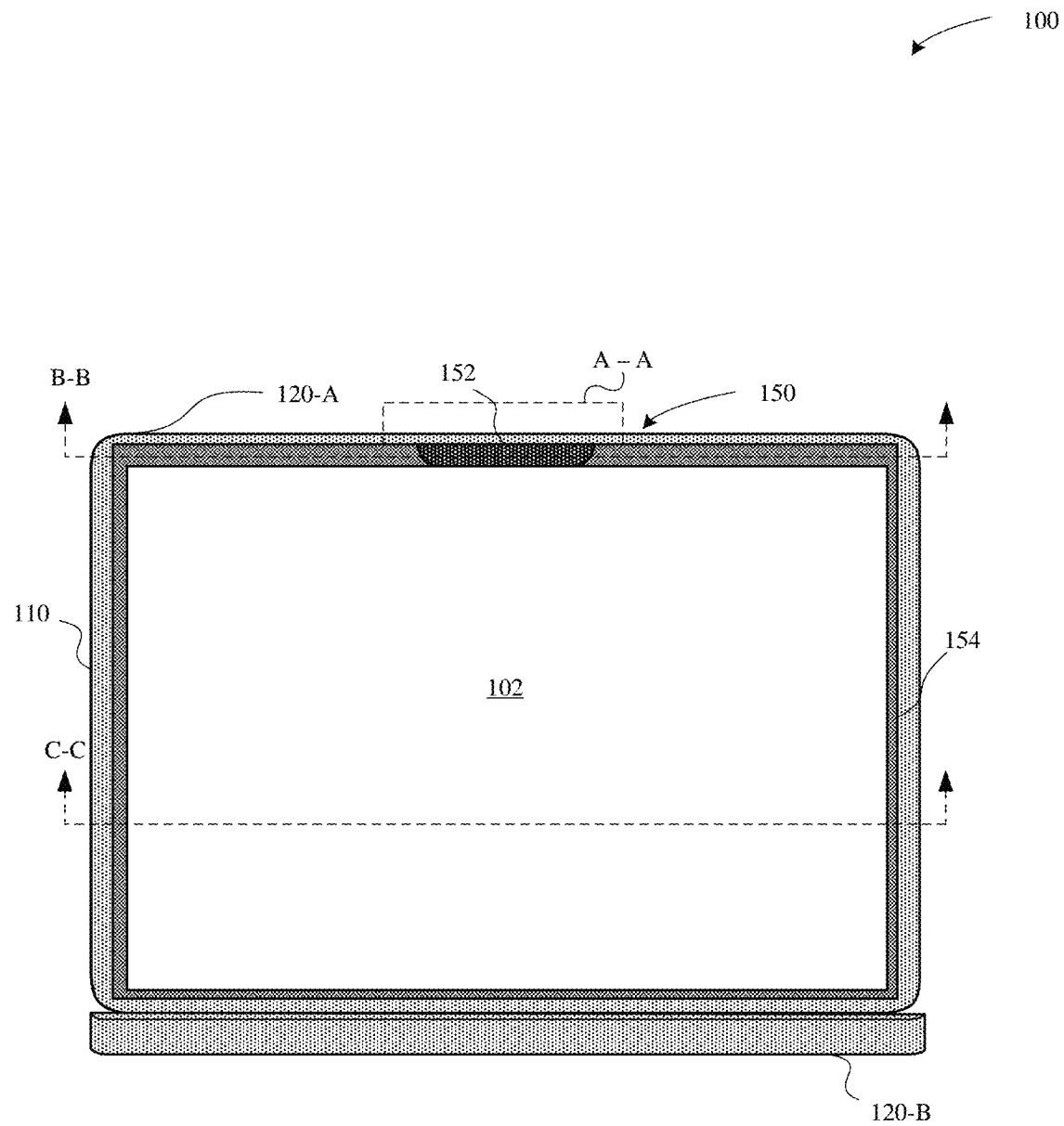

FIGS. 1A-1B illustrate various views of a portable computing device that is capable of incorporating the various systems described herein, in accordance with some embodiments. In particular, the portable computing device includes a biometric authentication module that is capable of authenticating a user of the portable computing device. FIG. 1A illustrates a front facing perspective view of a portable computing device 100 (e.g., a laptop computer), in accordance with some embodiments. The portable computing device 100 includes a base portion 120-B (also referred to as a lower case, a base, and the like), which is pivotally and/or rotatably coupled to a lid portion 120-A (also referred to as a display lid, an upper case, and the like). The base portion 120-B and the lid portion 120-A may refer to different sections of an enclosure 120 of the portable electronic device 100. In some embodiments, the lid portion 120-A pivots and/or rotates with respect to the base portion 120-B with respect to a hinge 104. In particular, the hinge 104 may include a clutch assembly capable of pivoting the lid portion 120-A with respect to the base portion 120-B. The lid portion 120-A may pivot with respect to the base portion 120-B between a closed position and an open position by using the hinge 104. According to some examples, the closed position may correspond to an angle between an internal surface of the lid portion 120-A and an internal surface of the base portion 120-B that is less than 1°. According to some examples, the open position may correspond to an angle between the internal surface of the lid portion 120-A and the internal surface of the base portion 120-B that is greater than 1°. It should be noted that the open and closed positions may correspond to any predetermined angle.

According to some embodiments, the lid portion 120-A includes a housing 110 that carries a display layer 102. The housing 110 may be backed by a rear cover 112. The walls of the housing 110 of the lid portion 1120-A may define a cavity that is capable of carrying operational components (e.g., camera, display, light pattern recognition module, etc.). The base portion 120-B includes one or more input devices, such as a keyboard 140 or a touchpad 130 or a multi-function panel 160, any of which is capable of receiving input from a user. The base portion 120-B and the lid portion 120-A may each be formed from an enclosure that defines a cavity capable of carrying components. In some embodiments, cables (e.g., flex cables, etc.) may electrically couple the components of the lid and base portions 120-A, B.

According to some examples, the lid portion 120-A and/or the base portion 120-B may have a unibody construction (i.e., formed from a single piece of metal). According to some examples, the lid portion 120-A and/or the base portion 120-B may be formed of a combination of at least one of metal (e.g., aluminum, anodized aluminum, titanium, stainless steel, etc.), polymers (e.g., plastic, etc.), graphite fibers, glass, RF-transparent materials, and the like.

According to some embodiments, the portable computing device 100 includes a light pattern recognition module 150. In particular, the light pattern recognition module 150 is included and/or carried within a partition 152 that may be disposed adjacent to the display layer 102. In some examples, the partition 152 may be disposed above the display layer 102. In other examples, the partition 152 is disposed below the display layer 102 and/or along the sides of the display layer 102. In some examples, the partition 152 is a notch, a circle, an ellipse, a polygonal shape, a series of polygonal shapes, a curvilinear shape, or the like.

FIG. 1B illustrates a front view of the portable computing device 100, in accordance with some embodiments. In particular, FIG. 1B illustrates that the portable computing device 100 includes a partition 152 disposed above the display layer 102. The partition 152 may carry the light pattern recognition module 150. A protective cover 154 may overlay the display layer 102. Additionally, in some examples, the protective cover 154 may overlay the light pattern recognition module 150. As illustrated in FIG. 1B, the portable computing device 100 includes a reference section A-A, a cross-section B-B, and a cross-section C-C, as will be described in more detail herein.

Figure 2A:
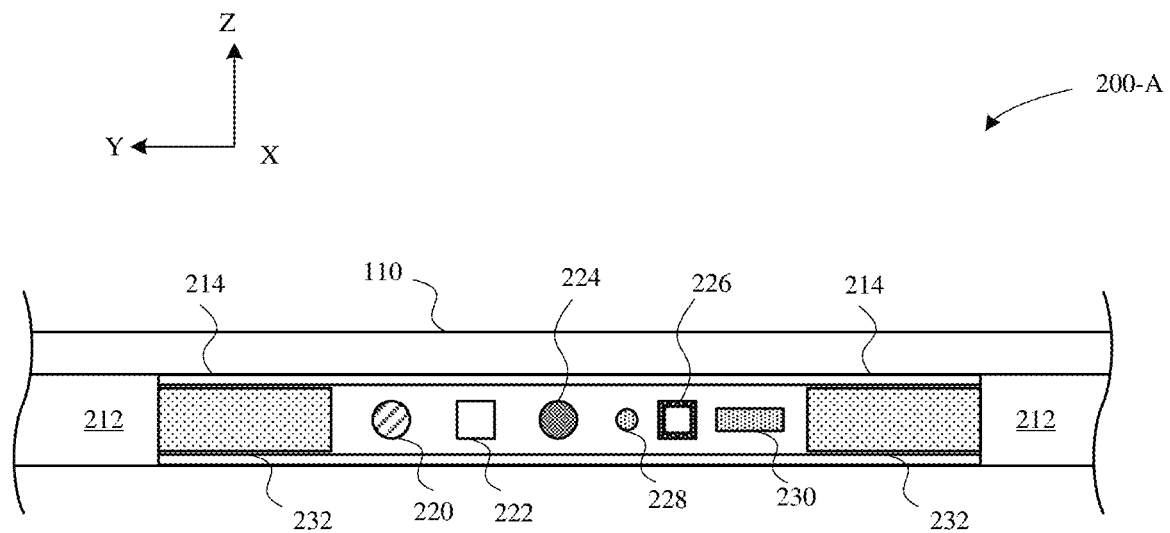
FIGS. 2A-2C illustrate various embodiments of a light pattern recognition module, in accordance with some embodiments.
Figure 2B:
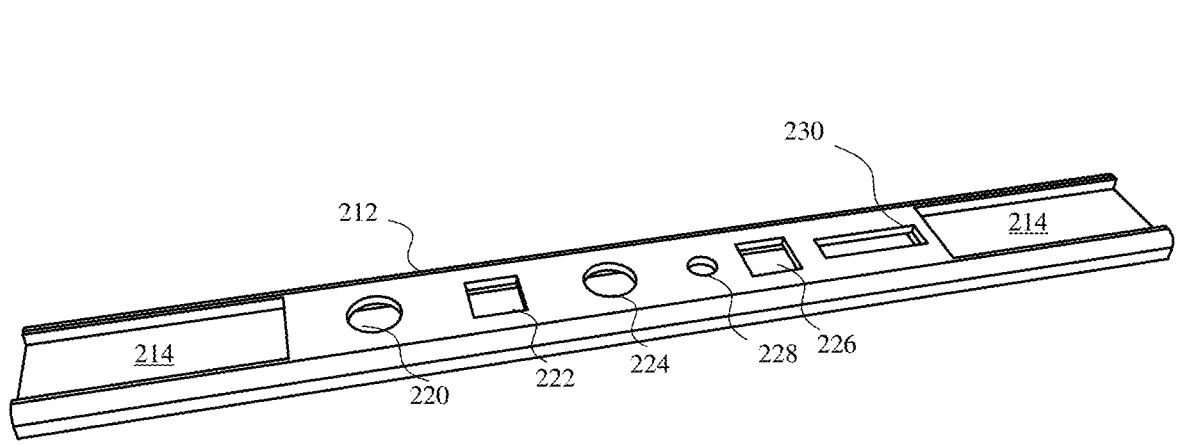
Figure 2C:
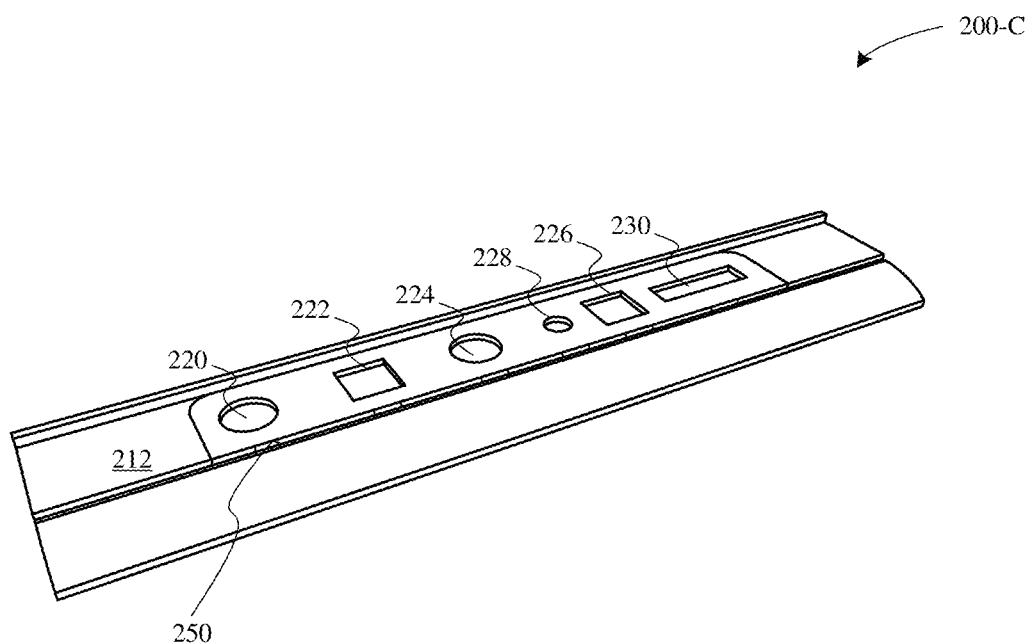

FIGS. 2A-2C illustrate various embodiments of a light pattern recognition module. In some examples, the light pattern recognition module may refer to the light pattern recognition module 150 as illustrated in FIGS. 1A-1B. In particular, FIGS. 2A-2C illustrate various embodiments of light pattern recognition modules 200-A, B, C as taken along the cross-section A-A of the portable computing device 100 illustrated in FIG. 1B.

FIG. 2A illustrates a light pattern recognition module 200-A, in accordance with some embodiments. The light pattern recognition module 200-A includes a bracket assembly 212 that is secured to the housing 110. In some examples, the housing 110 includes a recess or channel that is capable of receiving the bracket assembly 212. In some examples, the bracket assembly 212 is secured to the housing 110 by at least one of a laser weld, an adhesive, a fastener, a boss, a thermal glue, and the like. The bracket assembly 212 may be generally elongated to extend across a width of the rear cover 112. The bracket assembly 212 may be formed of a rigid material, such as stainless steel, aluminum, a composite material (e.g., carbon fiber, etc.) and/or plastic. In particular, in order for the light pattern recognition module 200-A to provide accurate recognition of the user and/or object, the light pattern recognition module 200-A and its respective operational components should be secured and prevented from moving when a load is applied to the rear cover 112.

The bracket assembly 212 includes various operational components, with each operational component providing a specific function. The light pattern recognition module 200-A includes a light dot projector 230 that is capable of emitting a predetermined pattern of light (e.g., IR light) towards an object that is external to the portable computing device 100. The light dot projector 230 may emit a pattern of light dots onto the object in order to form a depth map (or three-dimensional map) of the surface of the object. In some examples, the pattern of light is in a near-infrared or infrared (IR) light. In particular, the light dot projector 230 is capable of emitting multiple light rays that may not be in the visible light spectrum. As the pattern of light hits the surface of the object, the light is reflected back towards the light pattern recognition module 200-A at various angles of incidence.

In some embodiments, the light pattern recognition module 200-A includes a flood illuminator module 222 that is capable of illuminating the object during low light conditions. For example, the light pattern recognition module 200-A may include a sensor that is capable of determining an amount of light incident and/or proximate to the light pattern recognition module 200-A in order to determine whether the flood illuminator module 222 is necessary. If the sensor detects low light, then the flood illuminator module 222 illuminates the object with a spread of light.

The light pattern recognition module 200-A further includes a first camera module 220 that is capable of capturing an image of the object. In some examples, the first camera module 220 is capable of capturing a pattern of light (e.g., infrared (IR), or near IR) that is reflected by the object as a result of being illuminated with the light dot projector 230. As noted above, the light dot projector 230 emits multiple light rays at the object, which are subsequently reflected by the surface of the object at various angles. The first camera module 220 generally has a field of view (FOV) that is sufficient to capture at least a majority of the reflected pattern of light. In some examples, the FOV is at least 30° or greater. In other examples, the FOV is at least 60° or greater. In some examples, the first camera module 220 may include a filter that is capable of filtering out other types of light (i.e., non-IR light, etc.). In this manner, the first camera module 220 permits for only light that was emitted by the light dot projector 230 to be detected.

In some embodiments, the light pattern recognition module 200-A further includes a second camera module 224 that is capable of capturing an image of the object. In contrast to the first camera module 220, the second camera module 224 largely captures light within the visible wavelength spectrum in order to form a two-dimensional image of the object. In some examples, the second camera module 224 detects light according to the red, blue, and green (RGB) color space.

The bracket assembly 212 also includes a camera indicator light 228. In some examples, the bracket assembly 212 also includes a proximity sensor that is capable of detecting whether an object is proximate to the protective cover 154 and/or the display layer 102 of the portable electronic device 100. If an object is detected, then the proximity sensor may cause the display layer 102 to deactivate. The bracket assembly 212 further includes an ambient light sensor 226 that is capable of determining an amount of ambient light surrounding the portable electronic device 100. For example, in response to detecting a large amount of ambient light, the ambient light sensor 226 may provide a signal that causes a controller to increase the brightness of the screen generated by the display layer 102.

Additionally, the bracket assembly 212 includes partitions 214 that are recessed into the bracket assembly 212. Each of the partitions 214 is capable of carrying a printed circuit board 232 that is capable of providing electrical traces, circuits, current, and wiring to the various modules of the light pattern recognition module 200-A. The printed circuit board 232 is electrically coupled to a controller.

In some embodiments, the controller carried on the printed circuit board 232 is capable of receiving detection signals from the first and second camera modules 220, 224 that include the three-dimensional map and the two-dimensional image, respectively. The controller is capable of processing the pattern of light as reflected off the object. Additionally, in order to determine spatial relationships of the various features of the object, the controller is capable of combining the two-dimensional image of the object (as determined by the second camera module 224) with the three-dimensional depth map of the object (as determined by the first camera module 220) to form a three-dimensional profile of the object. In this manner, the light pattern recognition module 200-A is capable of performing a facial recognition task of a face of the user of the portable computing device 100.

Additionally, the controller is capable of providing a high current from a power supply (not illustrated) of the portable computing device 100 to the light dot projector 230. Indeed, in order to emit near –IR or IR light, the light dot projector 230 requires consumption of a large amount of energy. In this manner, the controller provides the high current to the light dot projector 230. Further, the controller is generally disposed adjacent or in proximity to the light dot projector 230 in order to ensure that there is minimal current loss while transmitting the current from the controller to the light dot projector 230.

FIG. 2B illustrates a perspective view of a light-detection module 200-B, in accordance with some embodiments. In particular, the light-detection module 200-B does not include the various modules—e.g., the light dot projector 230—within the bracket assembly 212. Instead the light-detection module 200-B includes the various cut-outs that are formed into the bracket assembly 212 for carrying the various modules. As an example, FIG. 2B illustrates that the bracket assembly 212 is generally elongated and includes partitions 214 that are cut into the material of the bracket assembly 212 for carrying the printed circuit board 232.

FIG. 2C illustrates a perspective view of a light-detection module 200-C, in accordance with some embodiments. The light-detection module 200-C is similar to the light-detection module 200-A except that the bracket assembly 212 of the light-detection module 200-C includes attachment features 250 that secure the bracket assembly 212 to the rear cover 112 and/or the housing 110. In some examples, the attachment features 250 may include a combination of a laser weld, bosses, fasteners, thermal adhesive, and the like.

Figure 3C:
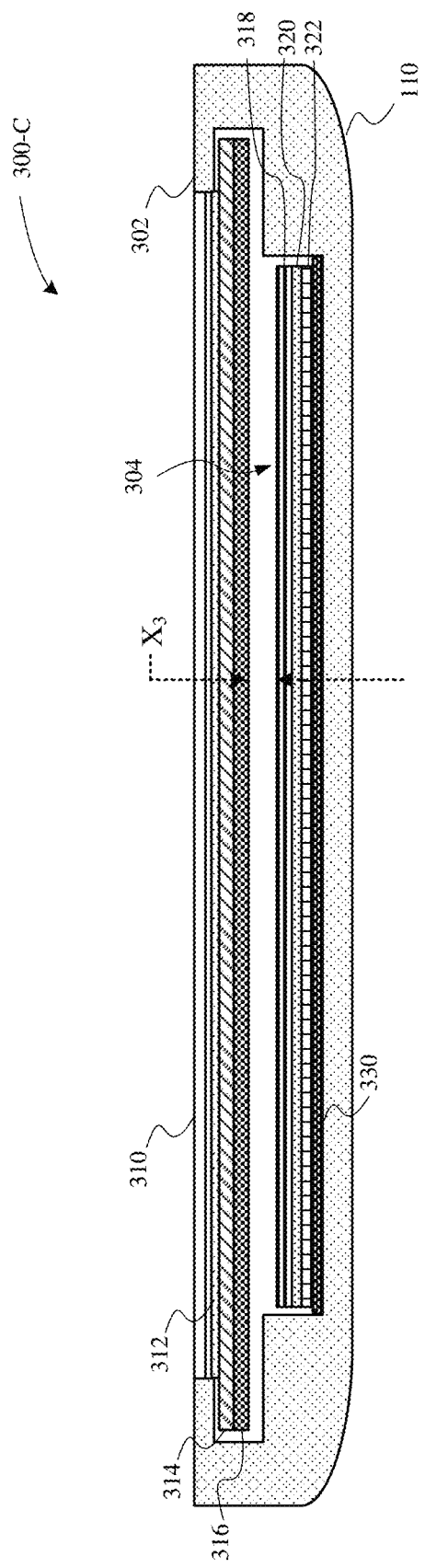

FIGS. 3A-3C illustrate cross-sectional views of various embodiments of the portable computing device. In particular, the portable computing device may refer to the portable computing device 100, as illustrated in FIGS. 1A-1B. In particular, FIGS. 3A-3B illustrate cross-sectional views of the various embodiments of the portable computing device 100 as taken along the cross-section B-B. FIG. 3C illustrates a cross-sectional view of the portable computing device 100 as taken along the cross-section C-C.

FIG. 3A illustrates a cross-sectional view of a portable computing device 300-A, in accordance with some embodiments. The portable computing device 300-A includes a housing 110 having a cavity 304 that is capable of carrying a display stack 320. The display stack 320 includes a polarizer 312, a color filter 314, and a display layer 316. The display stack 320 may be overlaid by a protective cover 310.

The protective cover 310 may be light-transmissive to allow a combination of at least one of visible light or IR light pass through. In some examples, the display layer 316 includes a liquid crystal display (LCD). In some examples, if the display layer 316 is a light-emitting diode (LED) layer, then the display stack 320 may also include a backlight layer (not illustrated). The display stack 320 may further include an anti-reflective disk 319. In some examples, the protective cover 310 may include insulating material (e.g., glass, etc.) that minimizes thermal energy generated by the light pattern recognition module 350 from reaching the display stack 320. In some examples, the anti-reflective disk is disposed behind the aperture of the second camera module 224.

A masking portion 302 of the housing 110 may mask a portion of the display stack 320 such as to prevent any visual artifacts (e.g., light bleed, etc.) from being visible to the user of the portable computing device. For example, if the display layer 316 is an LED layer, then the masking portion 302 may block out portions of the backlight layer.

Additionally, the housing 110 is capable of securing the display stack 320 within the cavity 304. In some examples, the display stack 320 may be secured to the housing 110 with an attachment feature, such as an adhesive. In this manner, the housing 110 also prevents the display stack 320 from oscillating. Furthermore, the housing 110 also increases the stiffness and rigidity of the display stack 320 by securing the display stack 320 to the housing 110.

As illustrated in FIG. 3A, a light pattern recognition module 350 is disposed below the display stack 320. Indeed, the cavity 304 provides sufficient room in the X-axis/Y-axis directions for the light pattern recognition module 350. In some embodiments, the light pattern recognition module 350 is secured to and carried by a bracket assembly—e.g., the bracket assembly 212—that is sheer coupled to the housing 110. FIG. 3A further illustrates a clearance distance ($X_1$) between the light pattern recognition module 350 and the display stack 320. The clearance distance ($X_1$) is sufficient to enable dissipation of thermal energy generated by the light pattern recognition module 350. In particular, the thermal energy is directed away from the display stack 320 and may instead be directed towards the housing 110. Beneficially, minimizing the amount of thermal energy directed towards the display stack 320 also minimizes any visual defects that are caused in the display layer 316. In some examples, the bracket assembly—e.g., the bracket assembly 212—may be formed of a material having a higher coefficient of thermal conductivity than materials of the display stack 320 so as to direct thermal energy away from the display stack 320. Additionally, in the event that the light pattern recognition module 350 oscillates when a load is applied to the portable computing device 300-A, the clearance distance ($X_1$) is sufficient so that the bracket assembly is prevented and/or unlikely to deflect into the display stack 320.

FIG. 3B illustrates a cross-sectional view of a portable computing device 300-B, in accordance with some embodiments. The portable computing device 300-B is similar to the portable computing device 300-A except for in at least that a portion of the displayer layer 316 is removed, as illustrated in FIG. 3B. In particular, the portion of the display layer 316 is removed to accommodate a transparent polarizer window 352. By incorporating the transparent polarizer window 352, any outgoing light generated by the light pattern recognition module 350 and/or incoming light is received by the light pattern recognition module 350. Moreover, any transistor wires associated with the removed portion of the display layer 316 can be re-routed around the transparent polarizer window 352 to other active areas of the display layer 316. It should be noted that the transparent polarizer window 352 is formed in a non-active area of the display layer 316. The non-active area may appear black and the non-active area does not include transistors, LEDs, or other light elements that are capable of displaying a visual effect on the display layer 102.

Furthermore, by removing the portion of the display layer 316, the clearance distance ($X_2$) between the light pattern recognition module 350 and the display stack 320 is increased, where ($X_2$)>($X_1$). Increasing the clearance distance ($X_2$) may increase the amount of thermal energy dissipation so as to prevent and/or minimize an even greater amount of thermal energy from being directed towards the display stack 320.

FIG. 3C illustrates a cross-sectional view of a portable computing device 300-C as taken along the cross-section C-C of the portable computing device 100, in accordance with some embodiments. The portable computing device 300-C includes a housing 110 having a cavity 304 that is capable of carrying a display stack 320. The display stack 320 includes a polarizer 312, a color filter 314, and a display layer 316. The display stack 320 may be overlaid by a protective cover 310. The display stack 320 overlays a flexible cable 330 that provides electrical communication, power, and/or signals between the light pattern recognition module 350 and a processor (e.g., main logic board, etc.). The flexible cable 330 is carried within the cavity 304. The flexible cable 330 has dimensions in the X-axis/Y-axis that are sufficient enough to carry the high current to the controller—e.g., the controller 230—while also enabling the flexible cable 330 to fit within the cavity 304.

FIG. 3C further illustrates that the portable computing device 300-C includes films 318, a light guide plate (LGP) 320, and a reflector 322. The film 318 prevent the light transmitted by the LGP 320 from being randomly scattered across an internal surface of the housing 110. The LGP 320 ensures that light transmitted by the display layer 316 is evenly distributed and reflected across the internal surface of the housing 110. Furthermore, it should be noted that the flexible cable 330 is not glued to the LGP 320 and/or the display layer 316 such as to ensure that light transmitted by the LGP 320 and/or the display layer 316 is allowed to evenly distribute throughout the cavity 304. However, it should be noted that the display stack 320 is physically supported by the housing 110 and the flexible cable 330. The flexible cable 330 may secured to the housing 110 with an adhesive or grounded to a conductive pressure-sensitive adhesive (PSA). In some examples, the flexible cable 330 includes exposed conductive signals such that the flexible cable 330 is grounded to the housing 110.

Figure 4A:
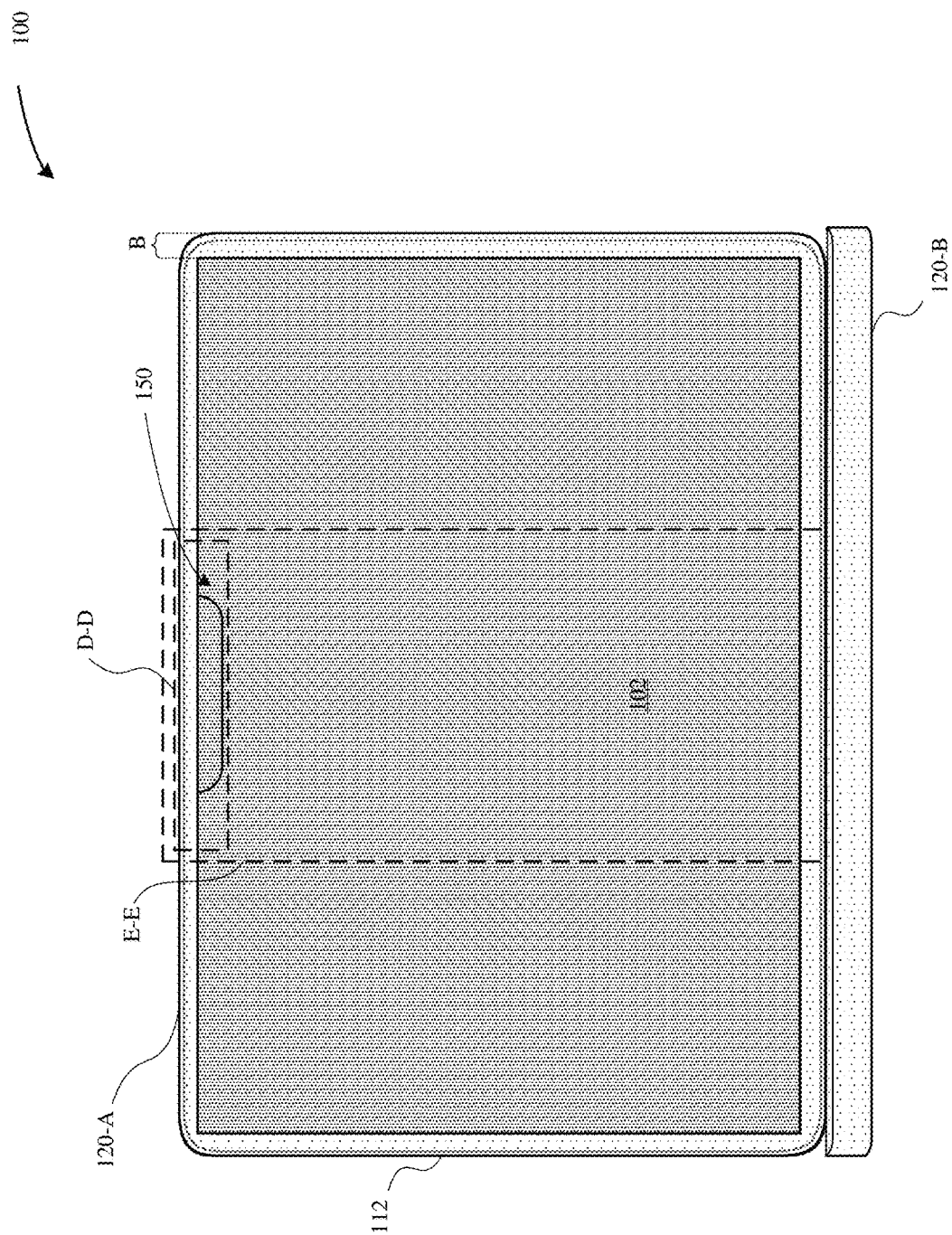
FIG. 4A-4E illustrate various views of a portable computing device, in accordance with some embodiments.

FIGS. 4A-4E illustrate various perspective views of a portable computing device having a light pattern recognition module, in accordance with some embodiments. FIG. 4A illustrates a front view of the portable computing device 100 in an open configuration. The portable computing device 400 includes a rear cover 112 that is part of the lid portion 120-A. The lid portion 120-A carries a display layer 102. The portable computing device 400 includes a reference section D-D and a reference section E-E that both extend through a medial portion of the lid portion 120-A, as will be described in more detail herein. A border (B) separates the display layer 102 from the external edges of the lid portion 120-A. In some examples, the border (B) is between 0.1-5 mm throughout. In some examples, the border (B) is uniform throughout.

Figure 4B:
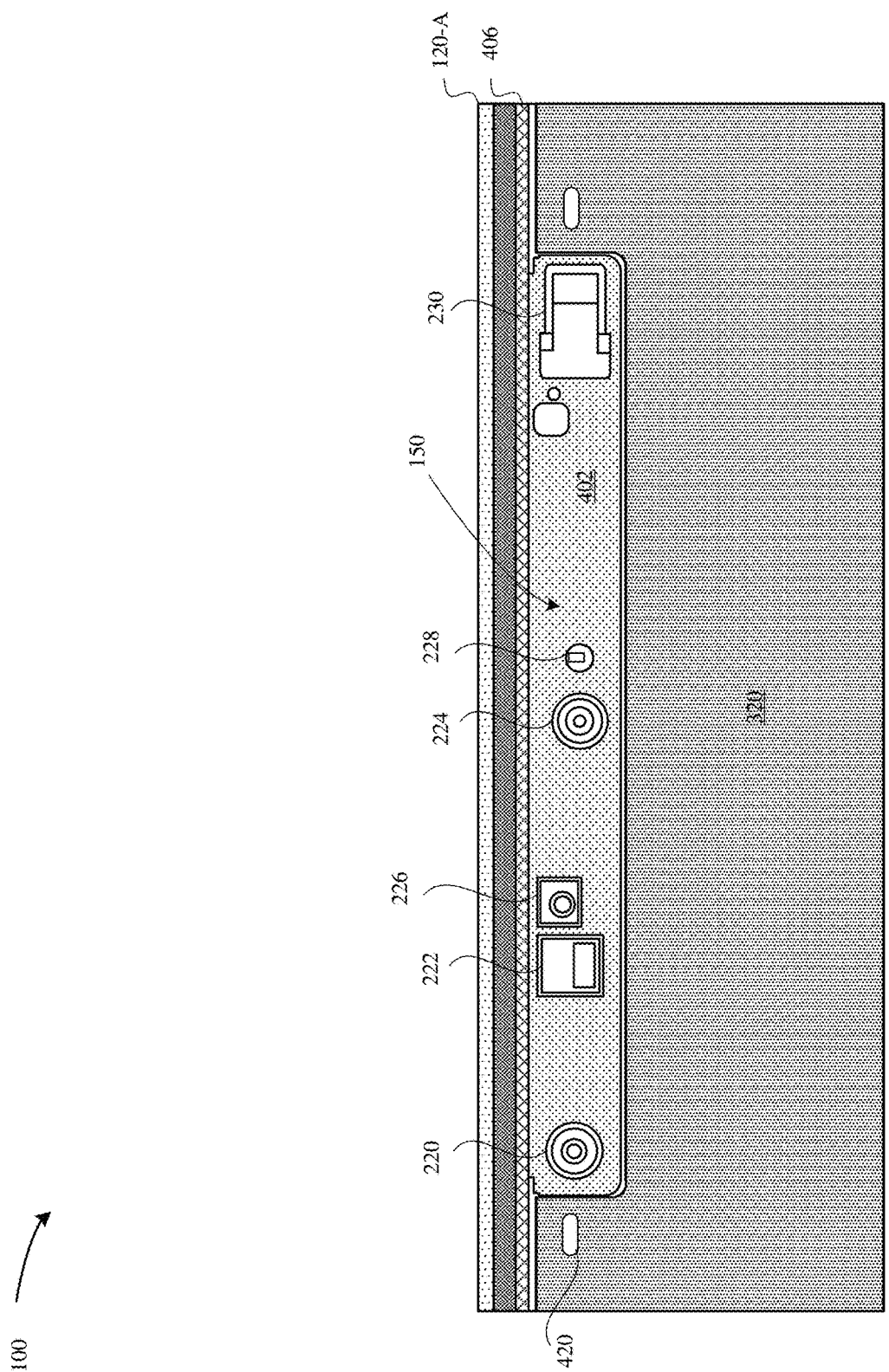

FIG. 4B illustrates a magnified view of the portable computing device 100 taken along the reference section D-D, in accordance with some embodiments. In particular, FIG. 4B illustrates the portable computing device 100 without the display layer 102 and the protective cover—e.g., the protective cover 310—thereby exposing the display stack 320. In contrast to the embodiments of the portable computing device 100 illustrated in FIGS. 3A, C, the portable computing device 100 illustrated in FIG. 4B illustrates that a notch (e.g., partition) is not cut into the display layer 102. Instead the bracket assembly 402 that carries the light pattern recognition module 150 has a size and shape profile that does not extend beyond the display stack 320. As a result, the display layer 102 overlays the bracket assembly 402. Although not illustrated in FIG. 4B, the portable computing device 100 may also include a polarizer—e.g., the polarizer 312—that overlay the light pattern recognition module 150. However, the notch (e.g., partition) is cut into a portion of the display stack 320. In some examples, transistor wires may be re-routed to facilitate for the presence of the light pattern recognition module 150 within the notch.

The light pattern recognition module 150 is carried by a bracket assembly 402. The bracket assembly 402 carries the first camera module 220, the flood illuminator module 222, the second camera module 224, the ambient light sensor 226, the camera indicator light 228, and the light dot projector 230. The display layer 102 may be secured to the display stack 320 via constraints 420.

The light dot projector is capable of emitting NIR or IR light through the display layer 102, and the first camera module 220 is capable of receiving NIR or IR light that is reflected by an object through the display layer 102. In some embodiments, an IR ink and/or IR coating may be applied behind the apertures of the first camera module 220 and the light dot projector 230 in order to facilitate transmission and detection of IR light. The IR coating may block select wavelengths of visible light while allowing select wavelengths of IR light to pass therethrough. In some examples, the IR coating replaces the anti-reflective disk 318.

Figure 4C:
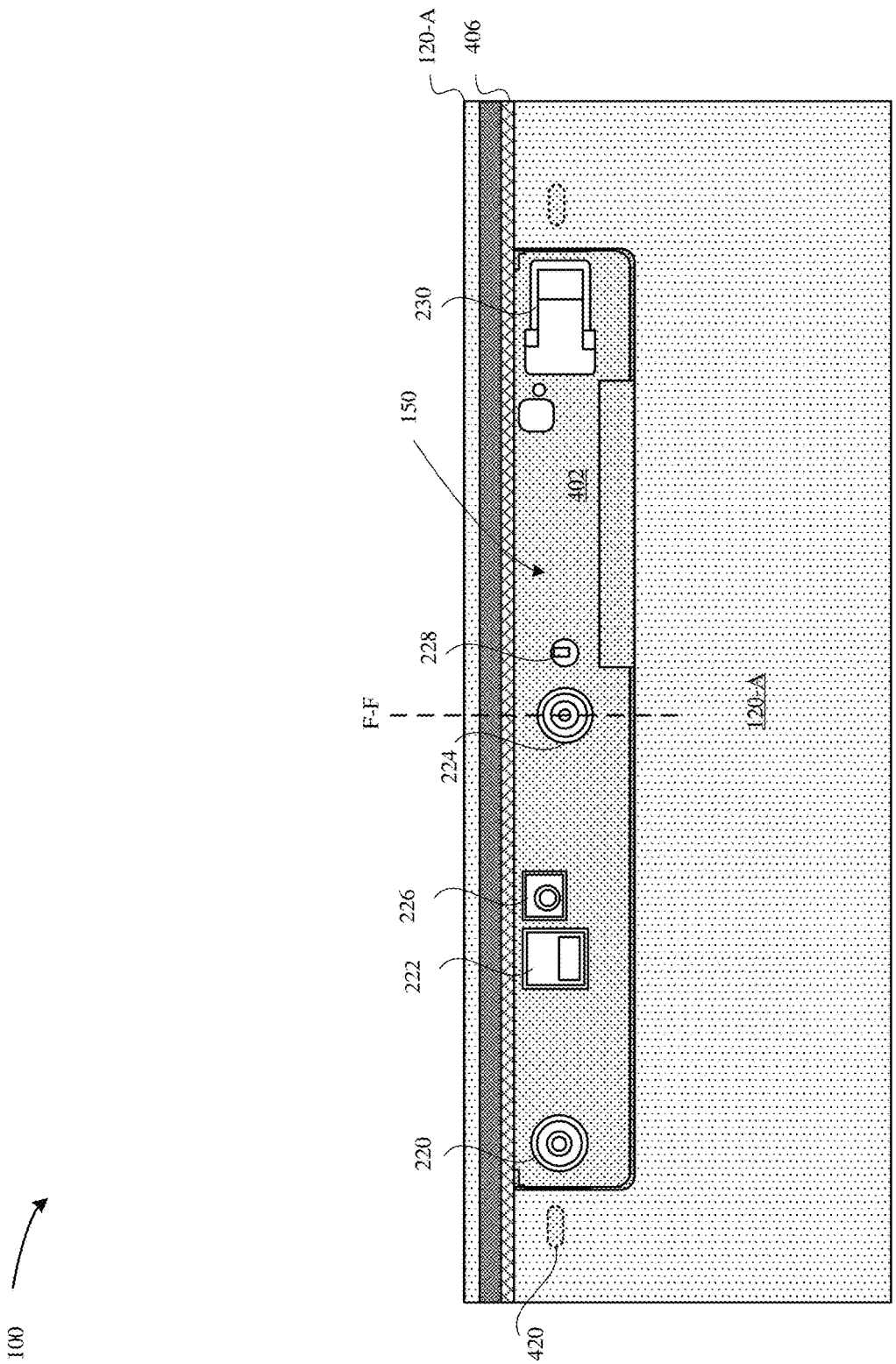

FIG. 4C illustrates a magnified view of the portable computing device 100 taken along the reference section D-D, according to some embodiments. In particular, FIG. 4C illustrates that the display stack 320 is removed, thereby exposing the underlying surface of the lid portion 120-A. FIG. 4C illustrates that the bracket assembly 402 is secured to the lid portion 120-A separate of the display stack 320. In some examples, the bracket assembly 402 may be secured to the lid portion 120-A with an adhesive.

Figure 4D:
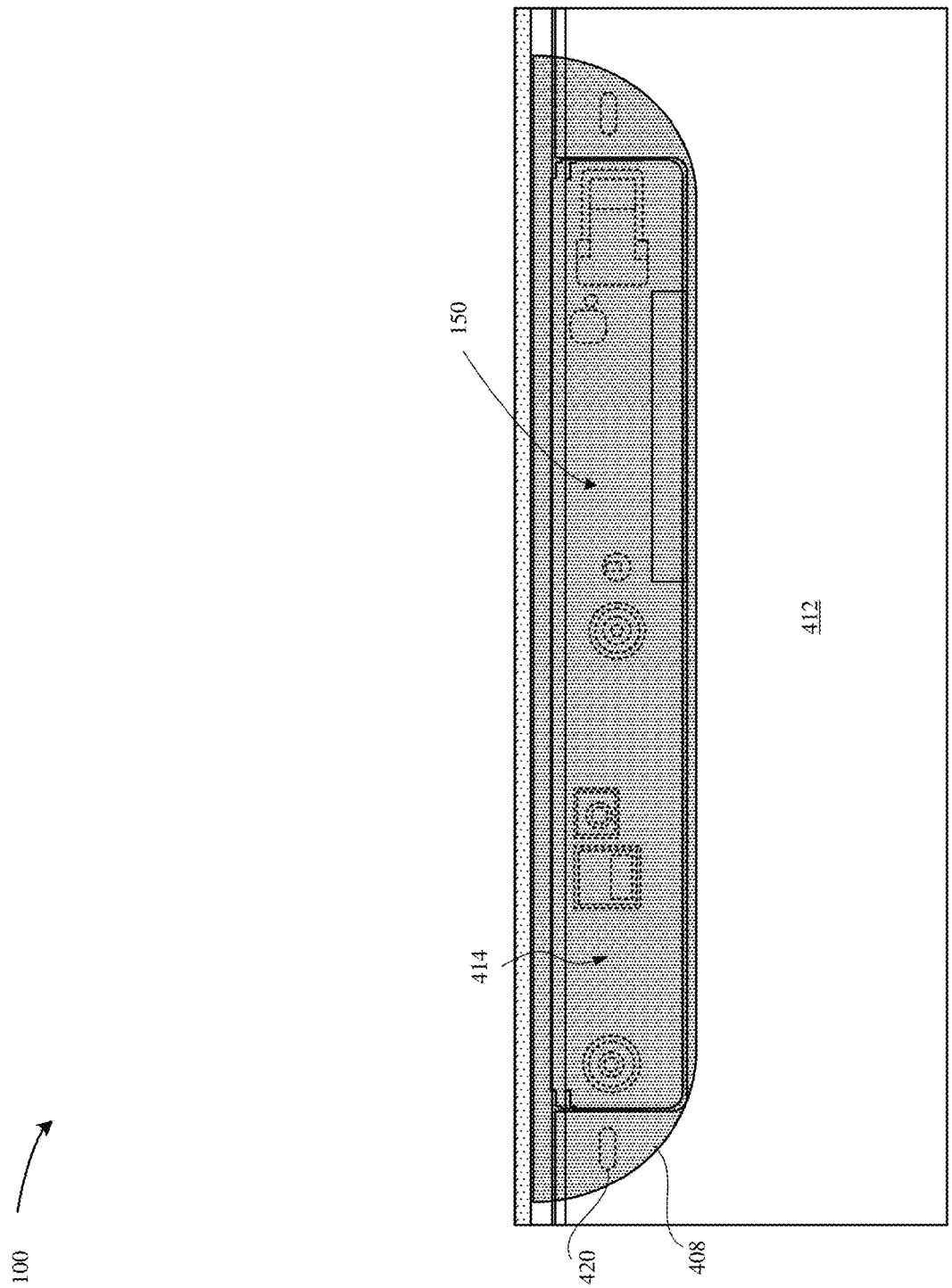

FIG. 4D illustrates a magnified view of the portable computing device 100 taken along the reference section D-D, according to some embodiments. In particular, FIG. 4D illustrates the display layer 102 that overlays portions of the bracket assembly 402 and the light pattern recognition module 150. In some examples, the display layer 102 includes an active area 406 separated from a non-active area 410 by the display notch 408. The display notch 408 may correspond to a notch within the display stack 320, where the bracket assembly 402 is carried within the notch of the display stack 320. The display layer 102 may be secured to the display stack 320 via constraints 420. Notably, the constraints 420 are secured to the non-active area 414 of the display layer 102. The non-active area 414 of the display layer 102 may appear black due to not having any light-emitting diodes and/or transistors. In contrast, the active area 412 may have light-emitting diodes capable of emitting light.

Figure 4E:
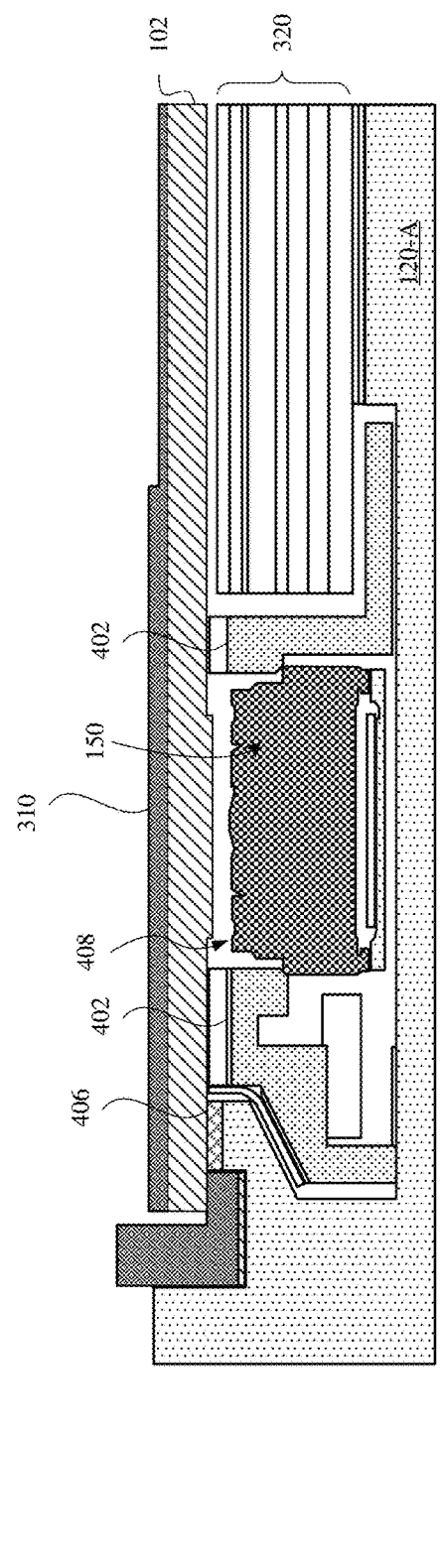

FIG. 4E illustrates a cross-sectional view of the portable computing device 100 taken along the reference section F-F (as illustrated in FIG. 4C), according to some embodiments. In particular, FIG. 4E illustrates that the bracket assembly 402 and the light pattern recognition module 150 both have heights that do not extend proud of the height of the display stack 320. As shown in FIG. 4E, the notch 408 is formed within the display stack 320, and the notch 408 has a size and shape fitted for the bracket assembly 402 that carries the light pattern recognition module 150. The protective cover 310 and the display layer 102 overlay the bracket assembly 402 and the display stack 320. The lid portion 120-A includes an adhesive 406 for securing the protective cover 410 to the lid portion 120-A. As illustrated in FIG. 4E, the surface area of the light pattern recognition module 150 may correspond to about 70% of the surface area of the notch 408. The light pattern recognition module 150 may be a weather-sealed module.

Figure 5:
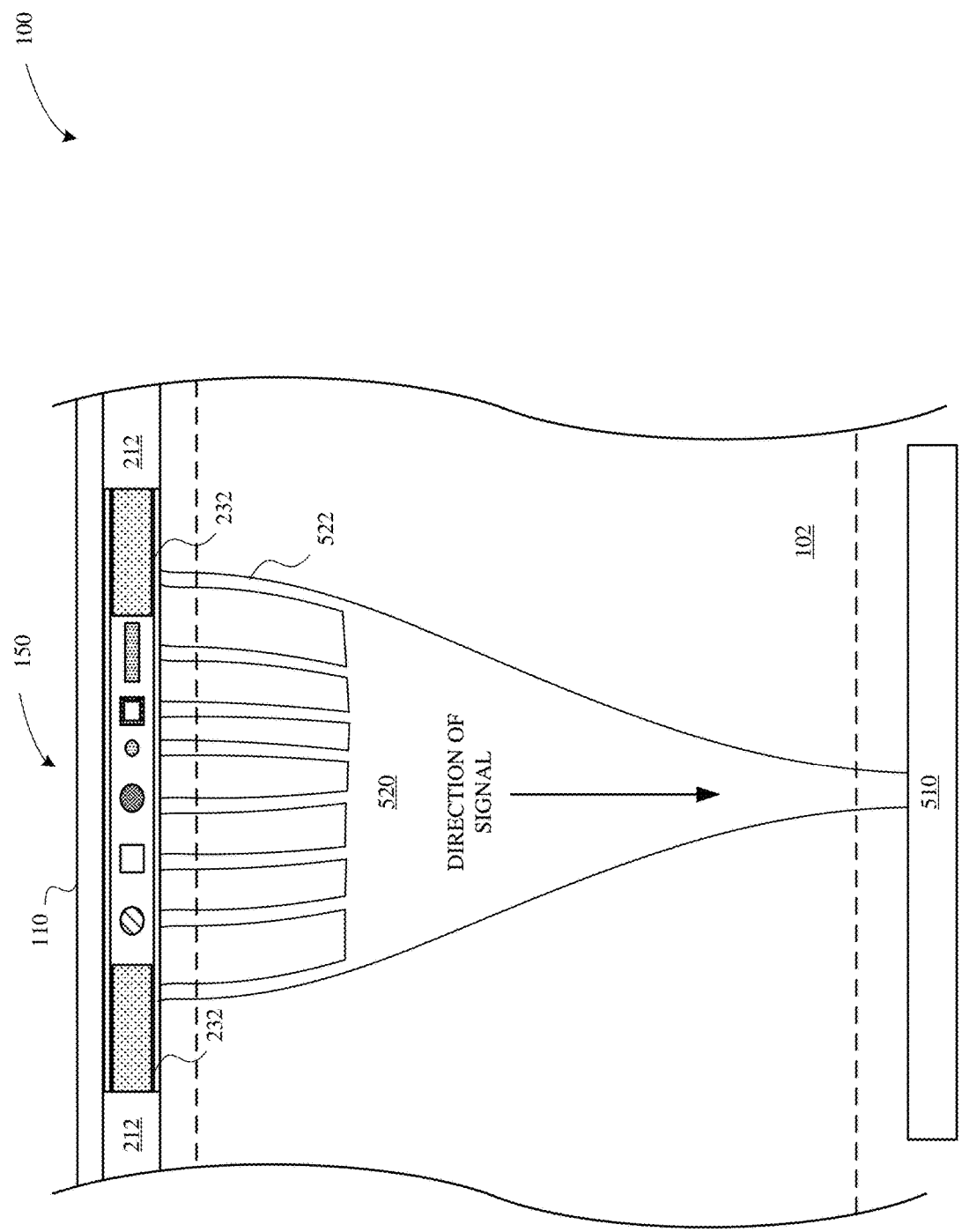
FIG. 5 illustrates a magnified back view of a portable computing device, in accordance with some embodiments.

FIG. 5 illustrates a magnified back view of the portable computing device 100 with the rear cover 112 removed, in accordance with some embodiments. In particular, FIG. 5 illustrates the portable computing device 100 of FIG. 4 taken along the reference section E-E. FIG. 5 illustrates a light pattern recognition module 150 that includes a bracket assembly 212 that is secured to the housing 110. The bracket assembly 212 includes various operational components— e.g., the first camera module 220—with each operational component providing a specific function. A flexible cable 520 electrically couples the various operational components of the light pattern recognition module 150 to a printed circuit board 510. In some examples, the printed circuit board 510 is disposed along a lower portion of the lid portion 120-A. However, in other examples, the printed circuit board 510 may also be disposed within the base portion 120-B. The printed circuit board 510 is capable of executing functions associated with the display layer 102.

As illustrated in FIG. 5, the flexible cable 520 is capable of transmitting data signals from the light pattern recognition module 150 that are indicative of the two-dimensional image of the object (as determined by the second camera module 222) with the three-dimensional depth map of the object (as determined by the first camera module 220) to form a three-dimensional profile of the object. In some examples, the printed circuit board 510 may transmit these data signals to a processor (e.g., MLB, etc.) to determine whether the composite image of the object (e.g., user) corresponds to a target image that is associated with a registered user of the portable computing device 100. In some examples, the processor determines whether the composite image satisfies a predetermined threshold value associated with the target image in order to determine whether to allow the user access to the portable computing device 100. In some examples, the light pattern recognition module 150 is disposed closer in proximity to the printed circuit board 510 in order to improve performance.

Figure 6C:
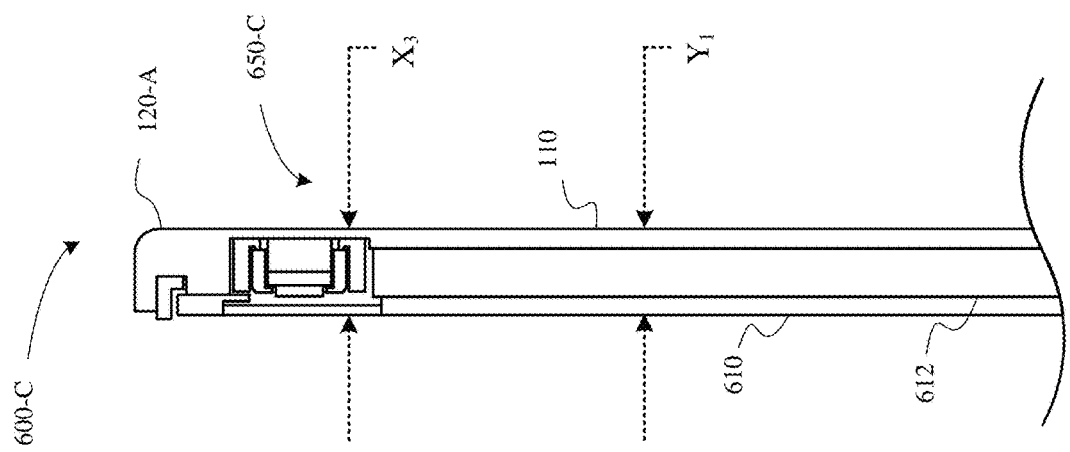
FIGS. 6A-6C illustrate side views of a portable computing device, in accordance with some embodiments.
Figure 6B:
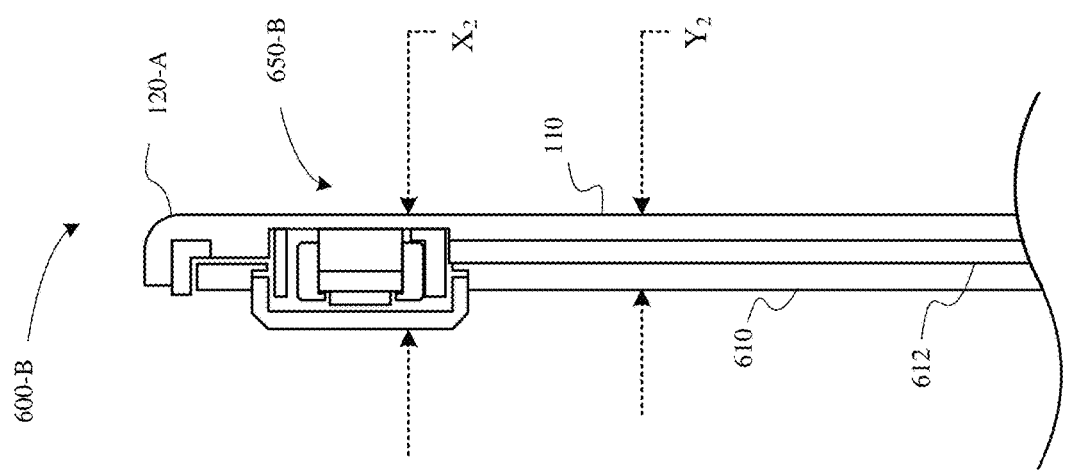
Figure 6A:
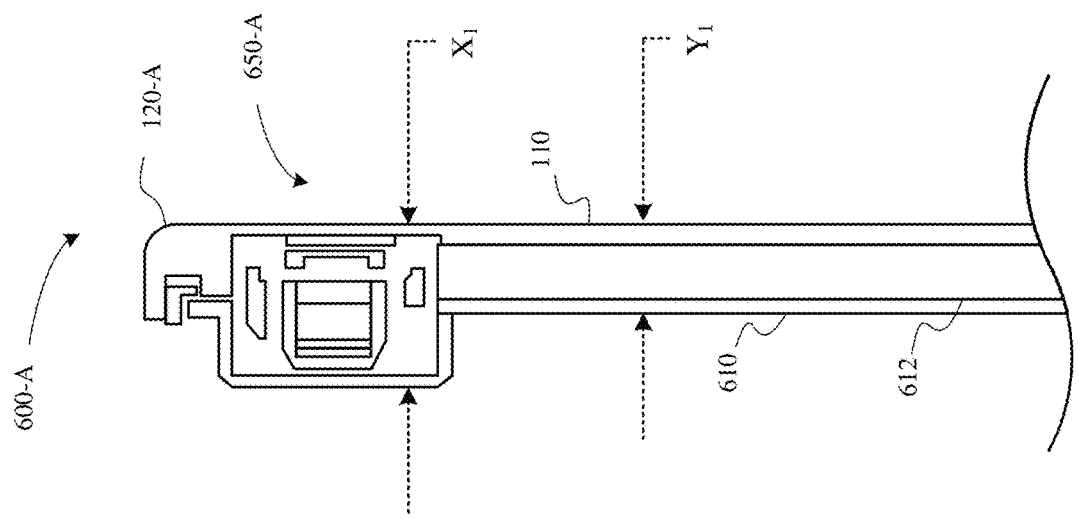

FIGS. 6A-6C illustrate side views of a portable computing device, in accordance with some embodiments. FIG. 6A illustrates a side view of a portable computing device 600-A that corresponds to the portable computing device 100, in accordance with some embodiments. The portable computing device 600-A includes a display 612 having a protective cover 610. The display 612 may refer to a standard resolution display. The housing 110 has a thickness ($Y_1$). Additionally, the portable computing device 600-A includes a light pattern recognition module 650-A that is carried at least partially within a cavity defined by the housing 110. However, the thickness (X1) of the light pattern recognition module 650-A exceeds a thickness ($Y_1$) of the cavity. As a result, the light pattern recognition module 650-A extends out of the surface of the protective cover 610.

FIG. 6B illustrates a side view of a portable computing device 600-B that corresponds to the portable computing device 100, in accordance with some embodiments. In contrast to the portable computing device 600-A, the portable computing device 600-B includes a display 622 having a thinner profile than the display 612. In some examples, the display 622 refers to a high resolution display. Additionally, the housing 110 has a thickness ($Y_2$) that is greater than the thickness ($Y_1$) of the portable computing device 600-A. As a result, the light pattern recognition module 600-B does not extend out of the surface of the protective cover 610 due to the housing 110 having the greater thickness, as well as the light pattern recognition module 650-B having a thickness ($Y_2$) that is less than ($Y_1$). It should be noted that although the light pattern recognition modules 650-A, B protrude from the protective cover 610, the portable computing device 100 may include a lip or recessed portion along the base portion 120-B that is capable of accommodating for the protrusion.

FIG. 6C illustrates a side view of a portable computing device 600-C that corresponds to the portable computing device 600, in accordance with some embodiments. In contrast to the portable computing devices 600-A, B, the portable computing device 600-C includes a light pattern recognition module 600-C having a thin profile such that the thickness ($X_3$) is less than ($X_1$) and ($X_2$). This is despite the housing 610 of the portable computing device 600-C having a thickness ($Y_1$) that is equal to the thickness ($Y_1$) of the housing 110 of the portable computing device 600-A. As a result, FIG. 6C illustrates that the light pattern recognition module 650-C does not protrude past the protective cover 610.

Figure 7:
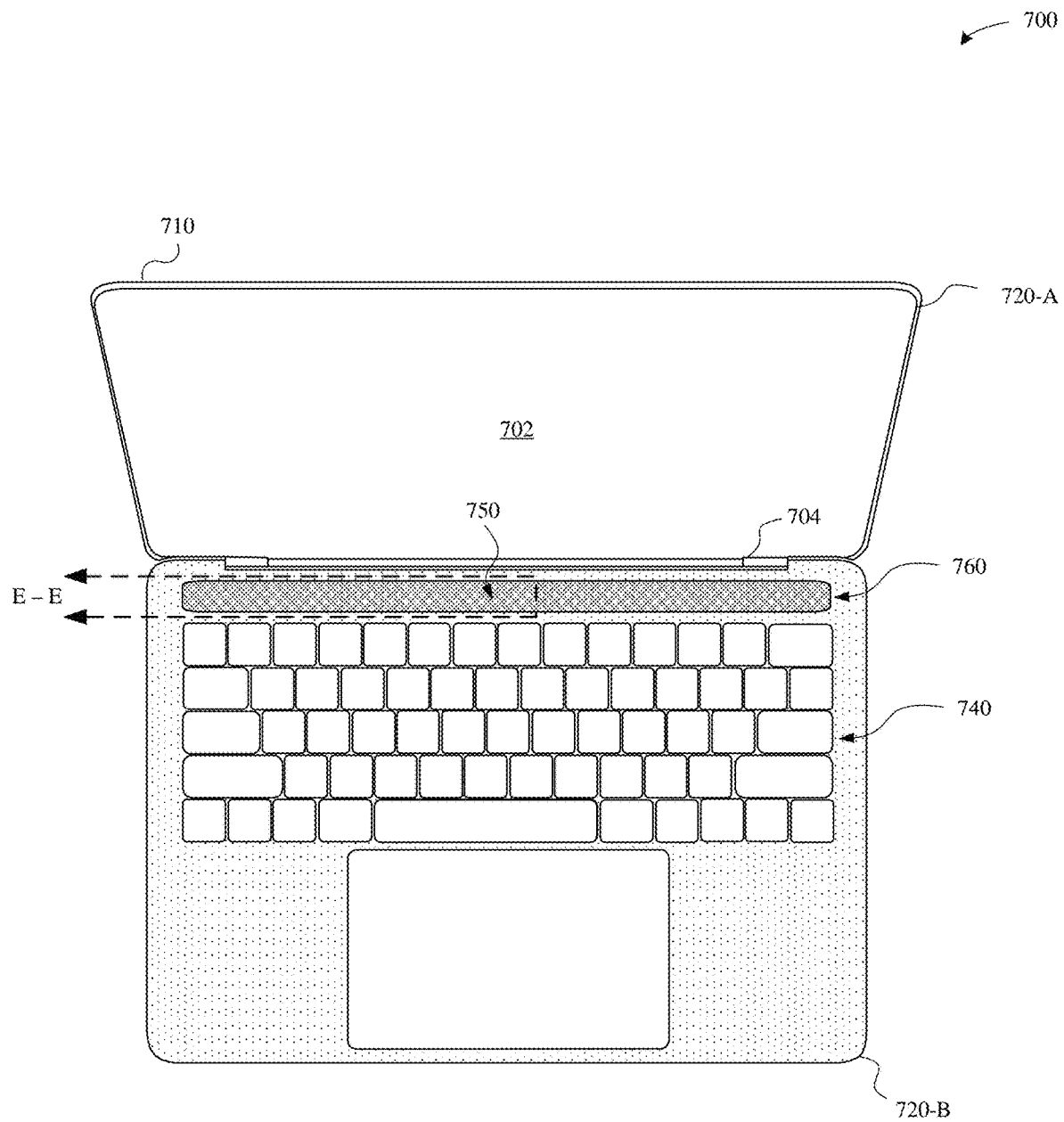
FIG. 7 illustrates a portable computing device that is capable of incorporating the various systems described herein, in accordance with some embodiments.

FIG. 7 illustrates a perspective view of a portable computing device that is capable of incorporating the various systems described herein, in accordance with some embodiments. In particular, FIG. 7 illustrates a portable computing device 700 in an open configuration. The portable computing device 700 includes a base portion 720-B (also referred to as a lower case, a base, and the like), which is pivotally and/or rotatably coupled to a lid portion 720-A (also referred to as a display lid, an upper case, and the like). The lid portion and the base portion 720-A, B may rotate via a hinge 704. The portable computing device 700 includes a housing 710 that defines a cavity that carries operational components that include a display 702. The base portion 720-B includes one or more input devices, such as a keyboard 740 or a multi-function panel 760, any of which is capable of receiving input from a user. The base portion 720-B and the lid portion 720-A may each be formed from an enclosure that defines a cavity capable of carrying components. In some embodiments, cables (e.g., flex cables, etc.) may electrically couple the components of the lid and base portions 720-A, B.

According to some embodiments, the base portion 720-B includes a light pattern recognition module 750. In some examples, the light pattern recognition module 750 may be carried within the hinge 704.

In some examples, the light pattern recognition module 750 be carried by the multi-function panel 760. In particular, the multi-function panel 760 may be overlaid by a protective layer, which may help to conceal the light pattern recognition module 750. In other examples, the multi-function panel 760 may be split into multiple active area sections, and the light pattern recognition module 750 is disposed between the multiple active area sections in a non-active area.

In other examples, the light pattern recognition module 750 may be carried within the keyboard 740. In particular, a key from the keyboard 740 may be raised and/or lowered to reveal the light pattern recognition module 750.

Figure 8A:
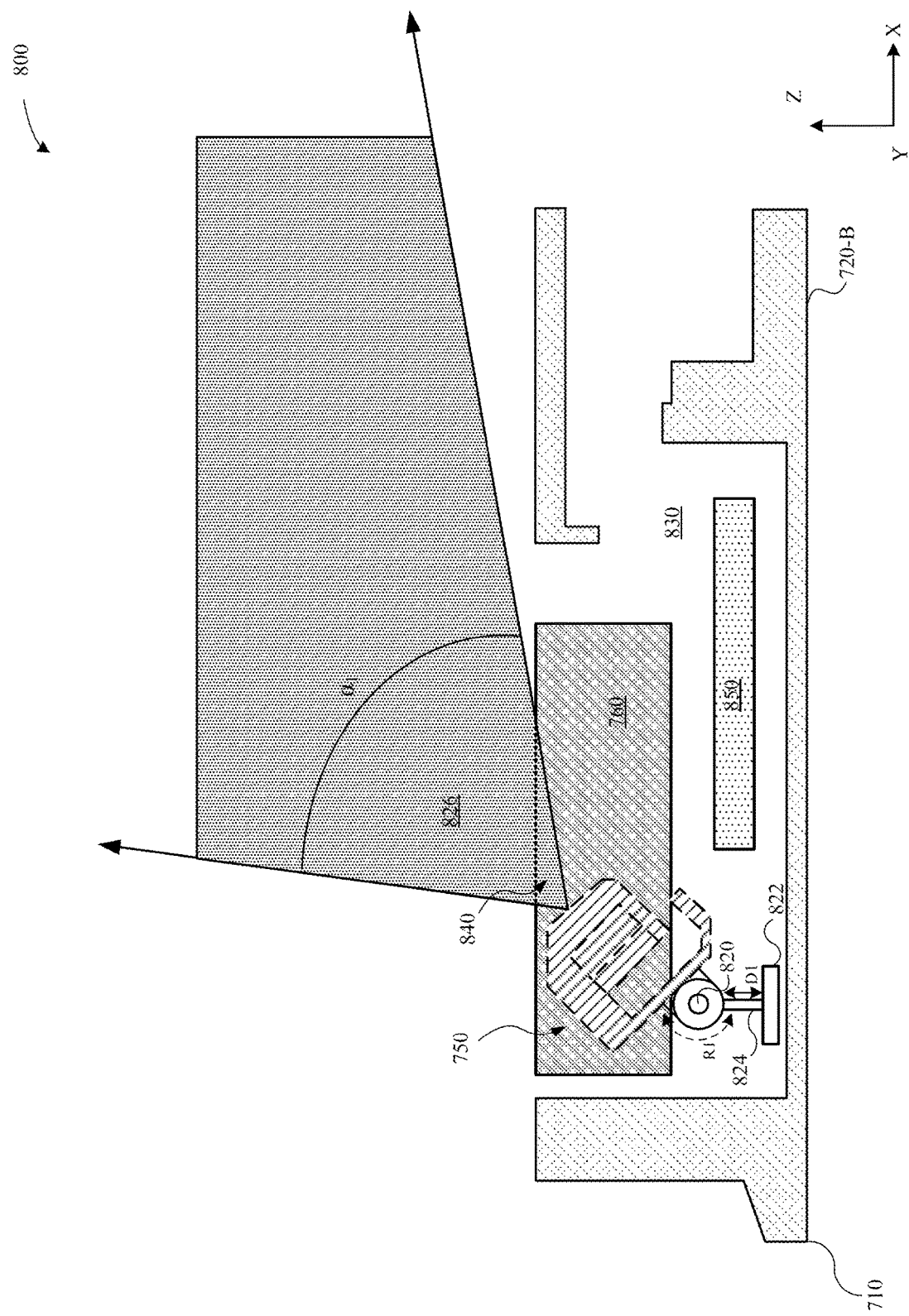
FIGS. 8A-8B illustrate cross-sectional views of a portable computing device, in accordance with some embodiments.
Figure 8B:
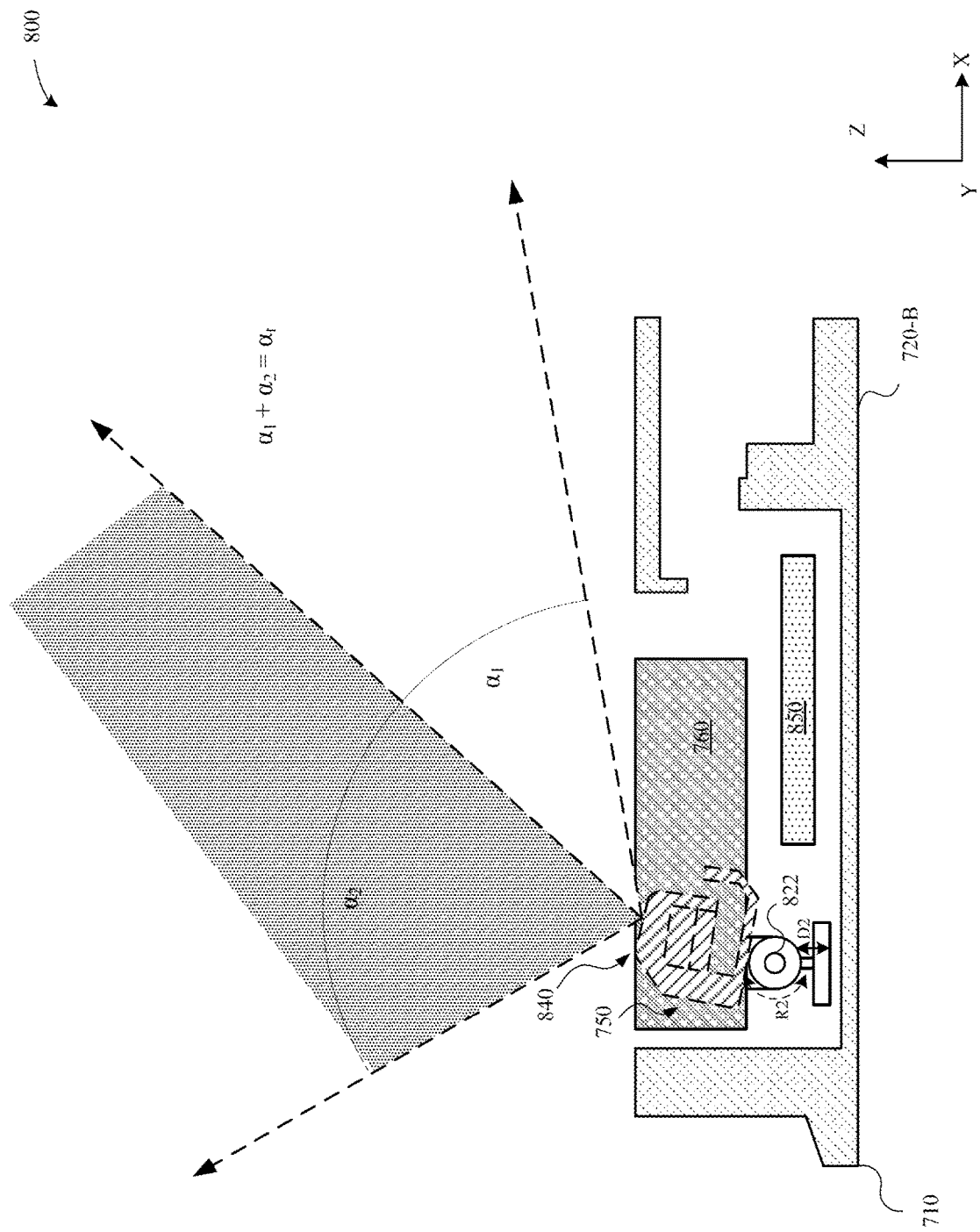

FIGS. 8A-8B illustrate cross-sectional views of a portable computing device, in accordance with some embodiments. In particular, FIGS. 8A-8B illustrate various embodiments of a portable computing device 800 as taken along the cross-section E-E of the portable computing device 700 illustrated in FIG. 7. FIG. 8A illustrates a portable computing device 800, in accordance with some embodiments. The portable computing device 800 includes the light pattern recognition module 750 that is carried within a cavity 830 that is defined by walls of the housing 710. The light pattern recognition module 750 is overlaid by the multi-function panel 760. As illustrated in FIG. 8A, the light pattern recognition module include a light dot projector module—e.g., the light dot projector 230—that is capable of emitting a light dot pattern 826 of near-IR or IR light. In some examples, the multi-function panel 760 includes an IR-transparent window 840 that is does not filter and/or obstruct the light dot pattern 826 from reaching the object (e.g., user, etc.) external to the portable computing device 800.

However, despite the absence of an IR filter, there may be instances where not all of the light dot pattern 826 reaches the surface of the object external to the portable computing device 800. In these instances, the portable computing device 800 is capable of adjusting the position and/or orientation of the light pattern recognition module 750 relative to the other operational components 850 of the portable computing device 800. In some embodiments, the light pattern recognition module 750 is supported by and coupled to a pivoting mechanism 820 and/or a translating mechanism 824 in order to impart adjustments of the light pattern recognition module 750 in at least 1-degree of freedom (DOF). The light pattern recognition module 750 may be secured to a support member 822 that is coupled to the housing 710. The pivoting mechanism 820 is capable of pivoting and/or rotating the various modules of the light pattern recognition module 750 relative to an axis such as to expand the field-of-view (FOV), thereby increasing the size and/or angle of the light dot pattern 826. In particular, FIG. 8A illustrates that a light dot projector—e.g., the light dot projector 230—of the light pattern recognition module 750 is capable of emitting the light dot pattern 826 according to an angle ($\alpha_1$). In some examples, the angle ($\alpha_1$) of the FOV is anywhere between about 30°-70°. However, as will be described in more detail with reference to FIG. 8B, the light pattern recognition module 750 is capable of being pivoted in order to expand the FOV.

In some embodiments, the pivoting mechanism 820 is capable of pivoting the light pattern recognition module 750 along an axis. FIG. 8A illustrates that the pivoting mechanism 820 is rotated by a circumference amount ($R_1$). In some embodiments, the translating mechanism 824 (e.g., a slider, etc.) is capable of translating the light pattern recognition module 750 along the Z-axis. In particular, the light pattern recognition module 750 may be raised or lowered so as to further adjust the FOV, as will be described with reference to FIG. 8B. FIG. 8A illustrates that the light pattern recognition module 750 is separated from the support member 822 by a distance ($D_1$).

FIG. 8B illustrates a cross-sectional view of the portable computing device 800 subsequent to adjusting the orientation and/or position of the light pattern recognition module 750, in accordance with some embodiments. In particular, FIG. 8B illustrates that the pivoting mechanism 820 has rotated about an axis such as to adjust the position of the various modules of the light pattern recognition module 750, including the light dot projector—e.g., the light dot projector 230 and first and second camera modules—e.g., the first and second camera modules 220, 222—so as to increase the FOV. FIG. 8B illustrates that the FOV of the light pattern recognition module 750 is at an angle ($\alpha_2$). In some examples, ($\alpha_2$) may be greater than, less than, or equal to ($\alpha_1$). Although it should be noted that the combination of ($\alpha_1$)+($\alpha_2$)=($\alpha_t$) such that the FOV is greater than would be otherwise possible without pivoting and/or translating the light pattern recognition module 750.

As illustrated in FIG. 8B, the pivoting mechanism 820 has been pivoted along the axis. FIG. 8B illustrates that the pivoting mechanism 820 is rotated by a circumference amount ($R_2$). Furthermore, FIG. 8B illustrates that the translating mechanism 824 has translated the light pattern recognition module 750 by a distance ($D_2$), where ($D_1$)>($D_2$).

Despite the absence of an IR filter at the multi-function panel 760, there may be instances where not all of the light dot pattern 826 reaches the surface of the object external to the portable computing device 800. In these instances, the portable computing device 800 is capable of adjusting the position and/or orientation of the light pattern recognition module 750 relative to the other operational components 850 of the portable computing device 800. In some embodiments, the light pattern recognition module 750 is supported by and coupled to a pivoting mechanism 820 and/or a translating mechanism 824 in order to impart adjustments of the light pattern recognition module 750 in at least 1-degree of freedom (DOF). The light pattern recognition module 750 may be secured to a support member 822 that is coupled to the housing 710. The pivoting mechanism 820 is capable of pivoting and/or rotating the various modules of the light pattern recognition module 750 relative to an axis such as to expand the field-of-view (FOV), thereby increasing the size and/or angle of the light dot pattern 826. In particular, FIG. 8A illustrates that a light dot projector—e.g., the light dot projector 230—of the light pattern recognition module 750 is capable of emitting the light dot pattern 826 according to an angle ($\alpha_1$). In some examples, the angle ($\alpha_1$) of the FOV is anywhere between about 30°-70°. However, as will be described in more detail with reference to FIG. 8B, the light pattern recognition module 750 is capable of being pivoted in order to expand the FOV.

Additionally, it should be noted that the amount of rotation and/or translation of the light pattern recognition module 750 may be dependent upon the display angle between the lid portion 720-A and the base portion 720-B. For example, if a sensor (not illustrated) of the portable computing device 800 detects that the display angle is less than 90°, then the controller (not illustrated) of the light pattern recognition module 750 may adjust the amount of rotation and/or translation such as to increase the FOV and increase the size of the light dot pattern 826. In another example, if the sensor detects that the display angle is greater than 90°, then the controller (not illustrated) of the light pattern recognition module 750 may adjust the amount of rotation and/or translation such as to decrease the FOV and increase the size of the light dot pattern 826. This is partially due to the lid portion 720-A not obstructing the light dot pattern 826 from reaching the object. Additionally, adjusting the amount of rotation and/or translation of the light pattern recognition module 750 allows for the light emitter to increase the angle of the light dot pattern 826, and for the camera modules—e.g., the first and second camera modules 220, 222—of the light pattern recognition module 750 to receive the reflected pattern of light.

It should be noted that the light pattern recognition module 750 has a profile that may be small enough to fit within the cavity 830 of the portable computing device 800. However, due to other operational components 850 (e.g., MLB, multi-function panel 760, etc.), there may still be an amount of electromagnetic interference (EMI) that can affect the functionality of the light pattern recognition module 750 and/or the other operational components 850. Thus, by reducing the profile of the light pattern recognition module 750 as much as possible, there is a reduced chance of EMI throughout.

Figure 9:
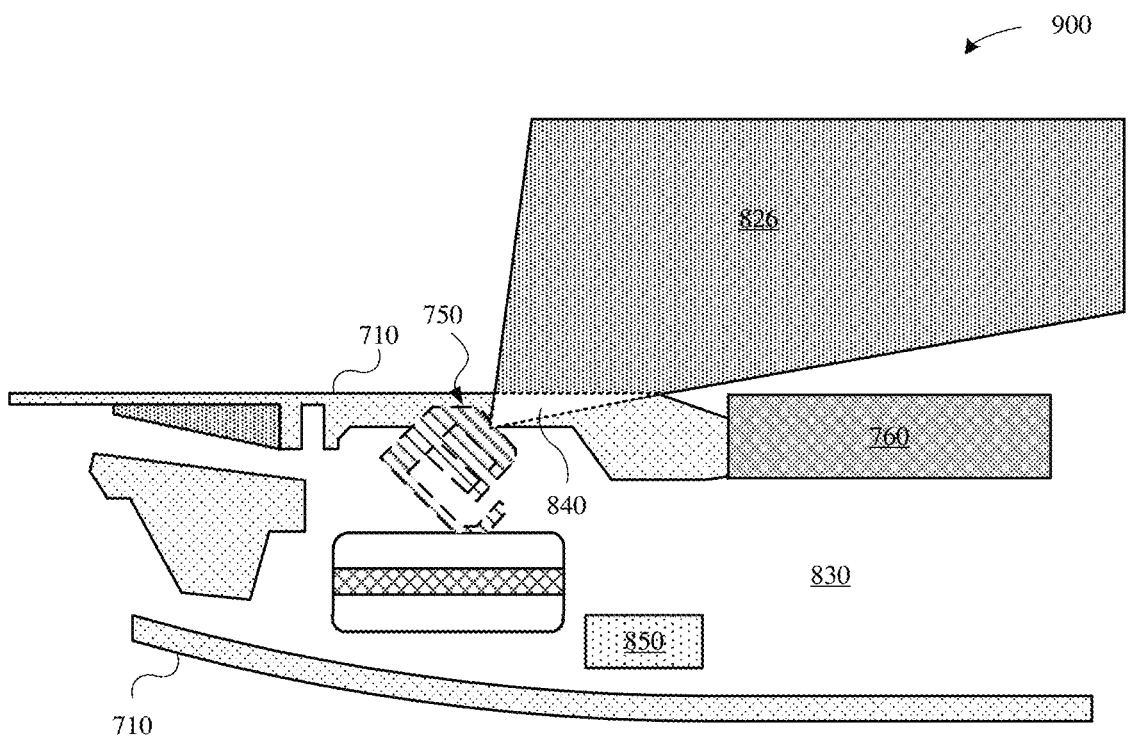
FIG. 9 illustrates a cross-sectional view of a portable computing device, in accordance with some embodiments.

FIG. 9 illustrates a cross-sectional view of a portable computing device, in accordance with some embodiments. In particular, FIG. 9 illustrate various embodiments of a portable computing device 900 as taken along the cross-section E-E of the portable computing device 700 illustrated in FIG. 7. FIG. 9 illustrates that the portable computing device 900 includes the light pattern recognition module 750 that is carried within a cavity 830 that is defined by walls of the housing 710. In some embodiments, the light pattern recognition module 750 is supported by and coupled to a pivoting mechanism 820 and/or a translating mechanism 824 in order to impart adjustments of the light pattern recognition module 750 in at least 1-degree of freedom (DOF) in order to change the FOV. In contrast to the portable computing device 800, the portable computing device 900 includes a curved base portion 720-B. The curved base portion 720-B may enable better cooling and/or enable more air flow into the cavity 830.

Figure 10:
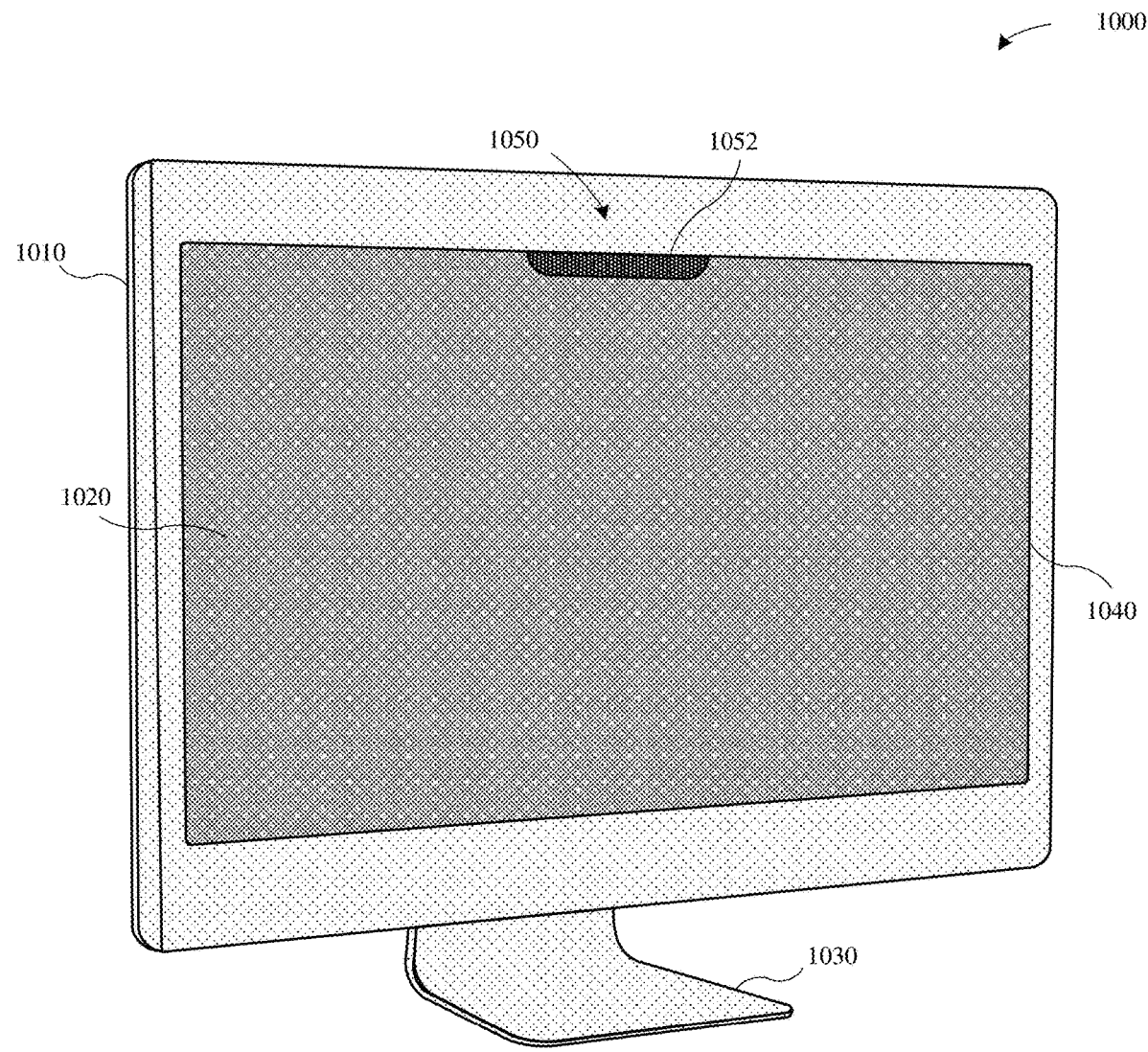
FIG. 10 illustrates a computing device that is capable of incorporating the various systems described herein, in accordance with some embodiments.

FIG. 10 illustrates a perspective view of a computing device 1000 that is capable of incorporating the various systems described herein, in accordance with some embodiments. In particular, the computing device 1000 includes a housing 1010 that carries a display layer 1020. The walls of the housing 1010 may define a cavity that is capable of carrying operational components (e.g., camera, display, light pattern recognition module, processor, MLB, etc.).

According to some embodiments, the weight of the housing 1010 is entirely supported by a stand 1030. The housing 1010 may have a unibody construction (i.e., formed from a single piece of metal). The housing 1010 may be formed of a combination of at least one of metal (e.g., aluminum, anodized aluminum, titanium, stainless steel, etc.), polymers (e.g., plastic, etc.), graphite fibers, glass, RF-transparent materials, and the like.

According to some embodiments, the computing device 1000 includes a light pattern recognition module 1050 that is disposed within a partition 1052. The partition 1052 and/or the display layer 1020 may be overlaid by a protective cover 1040. In particular, the light pattern recognition module 1050 is included and/or carried within the partition 1052 that may be disposed adjacent to the display layer 1020. In some examples, the partition 1052 may be disposed above the display layer 1020. In other examples, the partition 1052 is disposed below the display layer 1020 and/or along the sides of the display layer 1020. In some examples, the partition 1052 is a circle, an ellipse, a polygonal shape, a series of polygonal shapes, a curvilinear shape, or the like.

In some embodiments, the light pattern recognition module 1050 may generate an amount of thermal energy during its operation. In some examples, the protective cover 1040 may be formed of an thermal-insulating material that is capable of minimizing and/or prevent the thermal energy from reaching the display layer 1020. In some examples, the thermal-insulating material has a low coefficient of thermal conductivity that reduces the transmission of heat, thereby preventing the display layer 1020 from overheating. In some examples, the thermal-insulating material has a lower coefficient of thermal conductivity than material that comprises the housing 1010.

As illustrated in FIG. 10, because the protective cover 1040 may overlay the light pattern recognition module 1050, the protective cover 1040 may include an anti-reflective coating that overlays the surface of the protective cover 1040 such as to enable more reflected light to pass through the protective cover 1040.

Figure 11:
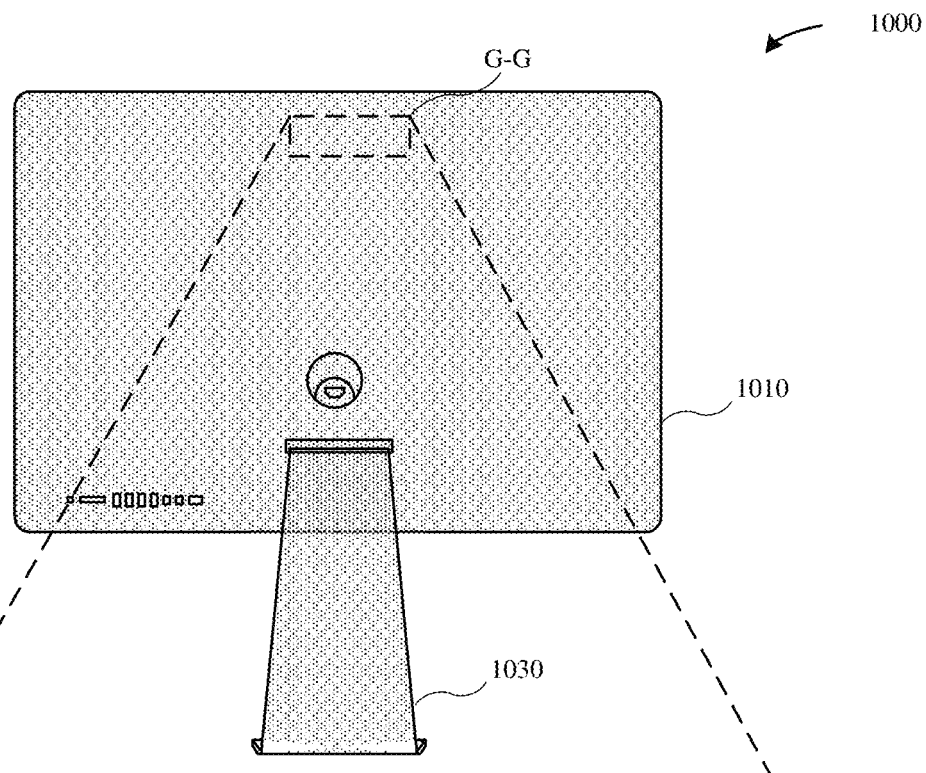
FIGS. 11-12 illustrate various views of a computing device that is capable of incorporating the various systems described herein, in accordance with some embodiments.
Figure 12:
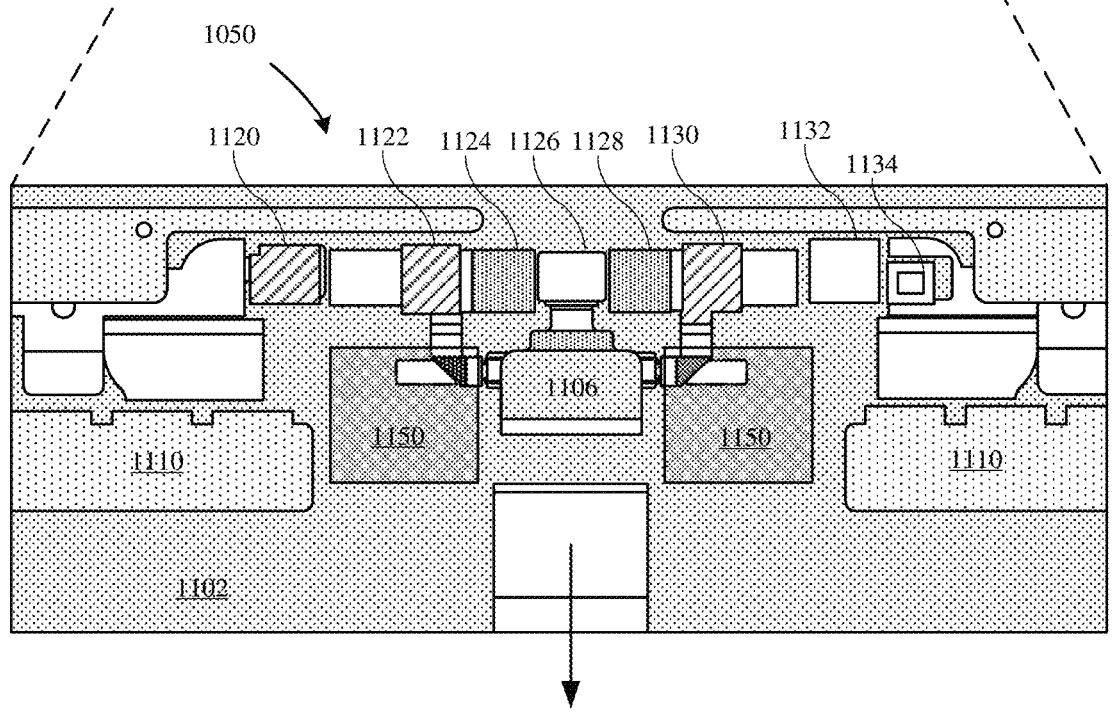

FIGS. 11-12 illustrate various views of the computing device 1000, in accordance with some embodiments. FIG. 11 illustrates a back view of the computing device 1000. The housing 1010 has a spline shape. FIG. 12 illustrates a magnified back view of the computing device 1000 with the housing 1010 removed, in accordance with some embodiments. In particular, the magnified back view of the computing device 1000 is taken along the reference section G-G, shown in FIG. 11.

FIG. 12 illustrates that the computing device 1000 includes a bracket assembly 1102 that carries various operational components including an ESD ground spring 1110, microphones 1122, a color indicator light 1124, an RGB camera 1126, and an ambient light sensor 1128. Additionally, partitions 1150 indicate expanded areas of the bracket assembly 1102 that are capable of accommodating a light emitter 1120, a light detector 1132 (e.g., a camera module, etc.), and a controller 1134. In other words, the light emitter 1120, the light detector 1132, and the controller 1134 may be repositioned to the partitions 1150 such as to expand the distance between the light emitter 1120 and the light detector 1132 in the Y-axis. Beneficially, increasing the amount of distance between the light emitter 1120 and the light detector 1132 so as to increase the range by which the light pattern recognition module 1050 is capable of emitting a predetermined pattern of light and detecting a pattern of light caused by the reflection of the predetermined pattern of light by an object. In other words, because the display layer 1020 of the computing device 1000 is significantly larger than the display layer 102 of the portable computing device 100, the user is more likely to sit or be positioned further away from the display layer 1020. In order to capture the surface profile and/or image of the user, the light emitter 1120 and the light detector 1132 may require a larger FOV for improved range detection so that the dots of the light pattern are further spread apart.

Additionally, FIG. 12 illustrates a connector 1106 that is electrically coupled to the various operational components. In some examples, the connector 1106 is expanded to accommodate for the increased amount of high current driving the light pattern recognition module 1050 as well as data signals transmitted to/from the various operational components. As noted above, the controller 1134 generally requires a large amount of high current in order to provide sufficient power to the light emitter 1120. As a result, a thicker flexible cable (not illustrated) may be required to connect to the various operational components.

Figure 13:
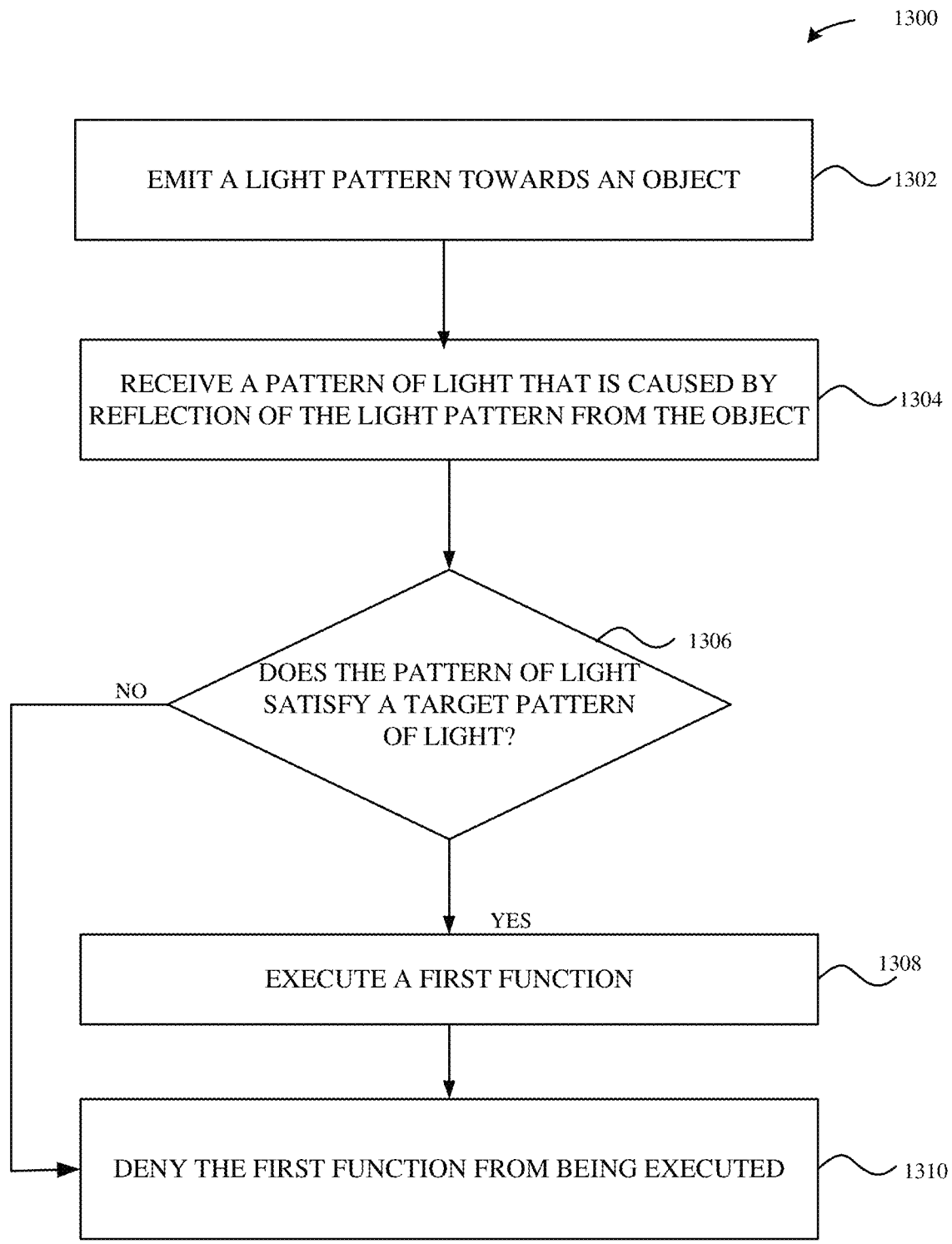
FIG. 13 illustrates a flowchart of a method for executing the various techniques described herein, in accordance with some embodiments.

FIG. 13 illustrates a flow diagram of a method 1300 for executing recognition of a light pattern at a computing device, in accordance with some embodiments. As illustrated in FIG. 13, the method 1300 begins at step 1302, where a controller of a light pattern recognition module—e.g., the light pattern recognition module 150—or a processor (e.g., a MLB, etc.) causes the light dot projector 230 to emit a light dot pattern of near-IR or IR light towards a surface of an object.

At step 1304, a light detector—e.g., the first and second camera modules 220, 222—receive the pattern of light that is caused by reflection of the light dot pattern on the surface of the object. Subsequently, the controller receives a detection signal from the light detector that includes the pattern of light as reflected by the surface of the object.

At step 1306, the controller compares the pattern of light as reflected by the surface of the object to a target pattern of light. In some examples, the target pattern of light may have been previously recorded and stored at a memory of the computing device—e.g., the portable computing device 100—or at a server device. In some examples, the target pattern of light may have been previously captured by the light pattern recognition module 150. For instance, during a setup of the portable computing device 100, the user may provide credentials associated with the user in order to provide biometric authentication of the user. In some examples, the credentials associated with the user may include a name, a date of birth, a surface profile of the face of the user, a depth map of the face of the user, profile of a cornea of the user, and the like.

In some embodiments, the controller determines whether the pattern of light relative to the target pattern of light satisfies a requisite threshold. For example, the requisite threshold may be at least 95% similarity or greater. If the controller determines that the pattern of light satisfies the target pattern of light, then the controller may enable the computing device to execute a first function, at step 1308.

Alternatively, if the controller determines that the pattern of light does not satisfy the target pattern of light, then the controller may deny the computing device to execute the first function, at step 13010.

Figure 14:
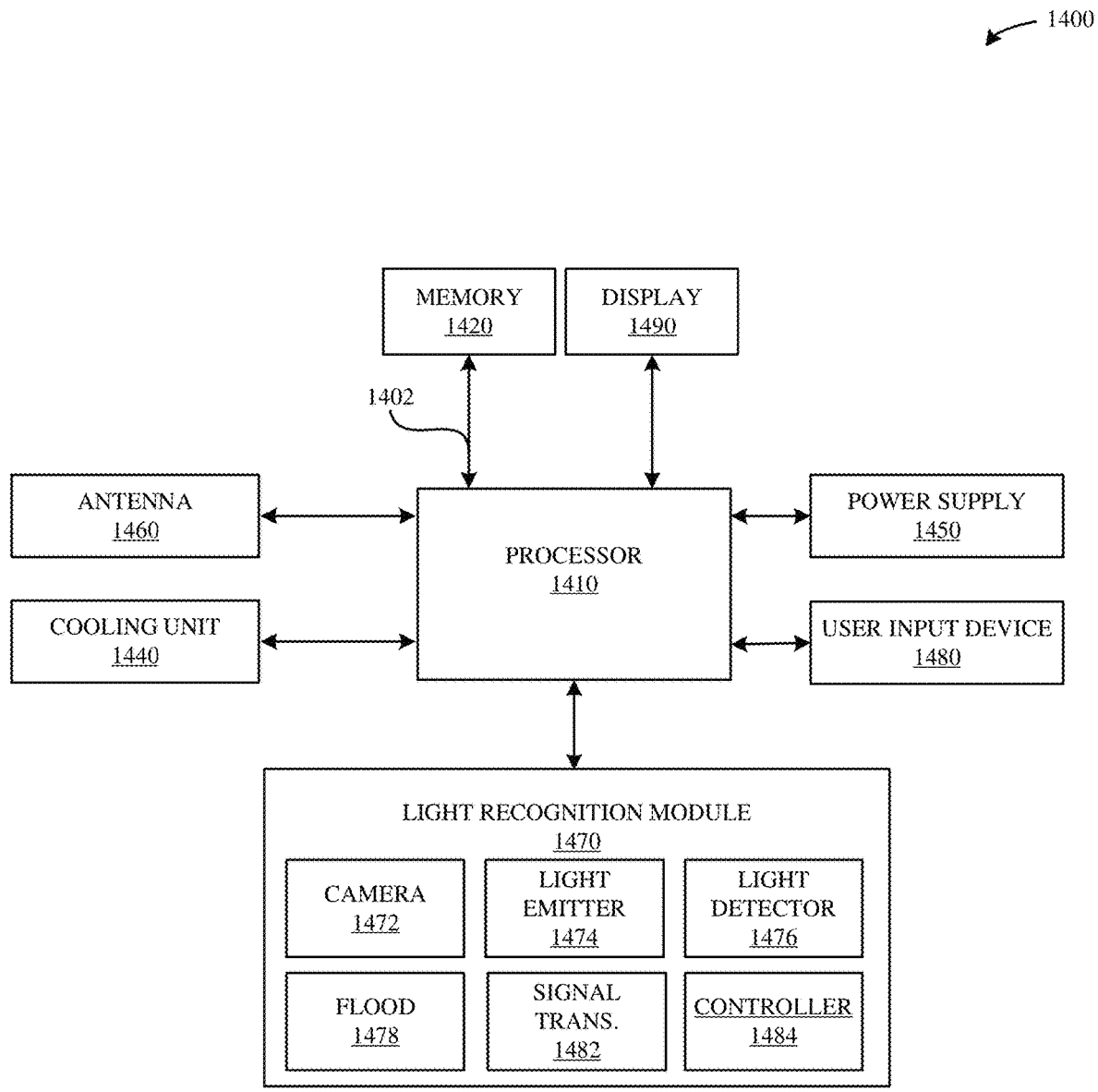
FIG. 14 illustrates a system diagram of a computing device that is capable of incorporating the various systems described herein, in accordance with some embodiments.

FIG. 14 illustrates a system diagram of a computing device 1400 that is capable of implementing the various techniques described herein, according to some embodiments. In particular, the detailed view illustrates various components that can be included in any one of the computing devices and/or portable computing devices, described herein.

As shown in FIG. 14, the computing device 1400 includes a processor 1010 for controlling the overall operation of the computing device 1400. The computing device 1400 can include a display 1490. The display 1490 can be a touch screen panel that can include a sensor (e.g., capacitance sensor). The display 1490 can be controlled by the processor 1410 to display information to the user. A data bus 1402 can facilitate data transfer between at least one memory 1420 and the processor 1410. The memory 1420 which can comprise a single disk or multiple disks (e.g., hard drives), and includes a storage management module that manages one or more partitions within the memory 1420. In some embodiments, the memory 1420 can include flash memory, semiconductor (solid state) memory or the like. The computing device 1400 can also include a Random Access Memory (RAM) and a Read-Only Memory (ROM). The ROM can store programs, utilities or processes to be executed in a non-volatile manner. The RAM can provide volatile data storage, and stores instructions related to the operation of the computing device 1400.

The computing device 1400 includes a user input device 1480, such as a keyboard or touchpad. The computing device 1400 includes a power supply unit 1450, such as a lithium-ion battery. The computing device 1400 includes an antenna 1460, such as a wireless antenna or transceiver that is capable of receiving and transmitting data signals. The computing device 1400 also includes a cooling unit 1440, such as a fan.

The computing device 1400 includes a light recognition module 1470 that is capable of emitting a predetermined pattern of light, and detecting a pattern of light that is caused by reflection of the predetermined pattern of light off one or more surfaces of object(s). In particular, the light recognition module 1470 may include a camera 1472 that is capable of capturing a two-dimensional image of the object, a light emitter 1474 capable of emitting a predetermined pattern of light at the object, a light detector 1476 capable of detecting a pattern of light caused by reflection of the predetermined pattern of light off the object, a flood 1478 that is capable of illuminating the object such that the predetermined pattern of light is more likely to reach the surface(s) of the object(s), a signal transmission line 1482 (e.g., a flexible cable) that is capable of providing a high current signal to the light recognition module 1470 from the power supply 1450 as well as data signals between the light recognition module 1470 and the processor 1410, and a controller 1484 for executing functions of the light recognition module 1470.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

As described above, one aspect of the present technology is the gathering and use of data available from various sources to enable user recognition, biometric authentication, enhanced user interaction, data encryption, and the like. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate a user, encrypt data associated with the user, provide targeted content to a specific user, act as a substitute for a password, and the like. Accordingly, use of such personal information data enables users an increased level of control and/or protection over their data. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A laptop computer having a base portion pivotally coupled to a lid portion, the laptop computer comprising:
   a display assembly carried by the lid portion, the display assembly comprising:
   a display layer defining an active area; and
   a display stack electrically coupled to and overlaid by the display layer, the display stack comprising a backlight layer defining a notch including an inactive area extending into the active area; and
   a camera module positioned in the notch adjacent to the display stack and overlaid by the display layer.

2. The laptop computer of claim 1, wherein a shape of the notch corresponds to a shape of the camera module.

3. The laptop computer of claim 1, wherein, the display stack comprises multiple layers, the notch defined by the multiple layers.

4. The laptop computer of claim 1, wherein a shape of the notch defines a circle, an ellipse, a polygon, or a curvilinear shape.

5. The laptop computer of claim 1, wherein:
   the laptop further comprises a processor electrically coupled to the camera module; and
   the camera module is configured to generate an image of an object and provided the image to the processor.

6. The laptop computer of claim 1, wherein the display assembly further comprises:
   a color filter; and
   a polarizer, wherein the display layer overlays the color filter and the polarizer.

7. A portable computing device comprising:
   a first housing portion pivotally coupled to a second housing portion, the first housing portion comprising:
   a display layer defining an active area configured to project light;
   a backlight layer in communication with the display layer and defining a notch including an inactive area extending into the active area; and
   a camera module disposed in the notch and overlaid by the display layer.

8. The portable computing device of claim 7, wherein the first housing portion further comprises a bracket securing the camera module in the notch.

9. The portable computing device of claim 8, wherein the bracket is disposed within the notch.

10. The portable computing device of claim 7, wherein the camera module is positioned adjacent the first housing portion.

11. The portable computing device of claim 7, further comprising an electronic component disposed in the notch.

12. The portable computing device of claim 7, wherein the display layer includes light-emitting diodes or liquid crystals.

13. The portable computing device of claim 7, wherein the notch is positioned along an edge of the backlight layer.

14. The portable computing device of claim 7, wherein the backlight layer is flush with or proud of the camera module.

15. An electronic device comprising:
a base; and
a lid pivotally coupled to the base, the lid comprising:
  a display stack defining a notch including an inactive display area having a first side and a second side surrounded by an active display area;
  a camera module disposed in the notch; and
  a display layer that overlays the display stack and the camera module.

16. The electronic device of claim 15, wherein the display stack comprises a backlight layer.

17. The electronic device of claim 15, further comprising a bracket securing the camera module within the notch.

18. The electronic device of claim 17, wherein the bracket is secured to the lid.

19. The electronic device of claim 15, wherein the display stack comprises a polarizing layer.

20. The electronic device of claim 15, wherein the notch is at least partially surrounded by active areas of the display stack.

* * * * *